United States Patent
Reiter et al.

(10) Patent No.: US 12,443,924 B2
(45) Date of Patent: Oct. 14, 2025

(54) PROGRAM ASSESSMENT AND MATCHING SYSTEM

(71) Applicant: ALTUS ASSESSMENTS INC., Toronto (CA)

(72) Inventors: Harold Reiter, Thronhill (CA); Kelly Dore, Burlington (CA)

(73) Assignee: ACUITY INSIGHTS INC., Toronto (CA)

( * ) Notice: Subject to any disclaimer, the term of this patent is extended or adjusted under 35 U.S.C. 154(b) by 281 days.

(21) Appl. No.: 17/971,444

(22) Filed: Oct. 21, 2022

(65) Prior Publication Data

US 2023/0129430 A1    Apr. 27, 2023

Related U.S. Application Data

(63) Continuation-in-part of application No. 17/451,724, filed on Oct. 21, 2021.

(30) Foreign Application Priority Data

Oct. 21, 2021   (CA) .................................. CA 3135227

(51) Int. Cl.
*G06Q 10/1053* (2023.01)
(52) U.S. Cl.
CPC ................. *G06Q 10/1053* (2013.01)
(58) Field of Classification Search
CPC ................................. G06Q 10/1053
See application file for complete search history.

(56) References Cited

U.S. PATENT DOCUMENTS

| | | | |
|---|---|---|---|
| 7,945,467 B2 | 5/2011 | Moss | |
| 8,781,884 B2 | 7/2014 | O'Shea, Jr. et al. | |
| 10,521,750 B2 | 12/2019 | Kraiger et al. | |
| 2009/0299993 A1* | 12/2009 | Novack | G06Q 30/0601 707/999.005 |
| 2011/0276356 A1* | 11/2011 | Smith | G06Q 30/08 705/321 |
| 2011/0276507 A1* | 11/2011 | O'Malley | G06Q 10/00 705/321 |
| 2012/0072361 A1* | 3/2012 | Bekerian | G06Q 10/1053 705/321 |
| 2015/0066559 A1* | 3/2015 | Brouwer | G06Q 10/1097 705/327 |
| 2015/0310456 A1* | 10/2015 | Vandenburgh | G06Q 30/0201 705/7.32 |
| 2016/0203432 A1* | 7/2016 | Shaw | G06Q 10/06393 705/7.39 |
| 2020/0387850 A1* | 12/2020 | Kramer | G06Q 10/06398 |
| 2021/0357872 A1* | 11/2021 | Gomez | G06F 3/14 |
| 2023/0334428 A1* | 10/2023 | Upadhyay | G06N 20/00 |

* cited by examiner

*Primary Examiner* — Jessica Lemieux
*Assistant Examiner* — Alaa Wadie Hussein
(74) *Attorney, Agent, or Firm* — Norton Rose Fulbright Canada LLP

(57) ABSTRACT

The improvements relate to a computer implemented assessment system with a hardware environment to improve security and usage of computer resources. The assessment system described herein provides quantitative measures of strength of alignment that is standardized, reliable, and defensible for position-filling decision-making.

24 Claims, 32 Drawing Sheets

Figure 6

Individual 1

| | Leadership Opportunities | Emphasis on Self-Reflection | Self-Teaching Opportunities | Career Preparation | Protected Education Time | Professional Identity Development | Culture of Feedback | Diverse Professional Opportunities | Row total |
|---|---|---|---|---|---|---|---|---|---|
| Leadership Opportunities | x | | 0 | | 1 | 0 | 1 | 0 | 0 | 2 |
| Emphasis on Self-Reflection | 1 | x | x | 1 | 1 | 1 | 1 | 0 | 6 |
| Teaching Opportunities | 0 | 0 | | x | 0 | 0 | 1 | 0 | 0 | 1 |
| Career Preparation | 1 | 0 | 1 | | | 1 | 1 | 0 | 0 | 4 |
| Protected Education Time | 0 | 0 | 0 | 0 | | x | 0 | 0 | 0 |
| Professional Identity Development | 1 | 0 | 1 | 0 | 1 | | x | 1 | 0 | 4 |
| Culture of Feedback | 1 | 1 | 1 | 1 | 1 | 1 | | 1 | 7 |
| Diverse Professional Opportunities | 1 | 0 | 1 | 1 | 1 | 0 | 0 | x | 4 |
| | | | | | | | | | 28 |

Individual 2

| | Leadership Opportunities | Emphasis on Self-Reflection | Self-Teaching Opportunities | Career Preparation | Protected Education Time | Professional Identity Development | Culture of Feedback | Diverse Professional Opportunities | Row total |
|---|---|---|---|---|---|---|---|---|---|
| Leadership Opportunities | x | | 0 | 0 | 0 | 0 | 0 | 0 | 0 | 0 |
| Emphasis on Self-Reflection | 1 | x | x | 0 | 1 | 1 | 1 | 1 | 6 |
| Teaching Opportunities | 1 | 1 | | x | 0 | 0 | 0 | 0 | 0 | 2 |
| Career Preparation | 1 | 0 | 1 | | | 0 | 1 | 1 | 0 | 4 |
| Protected Education Time | 1 | 0 | 1 | 1 | | x | 0 | 0 | 1 | 4 |
| Professional Identity Development | 1 | 0 | 1 | 0 | 1 | | x | 0 | 1 | 4 |
| Culture of Feedback | 1 | 0 | 1 | 0 | 1 | 1 | | 1 | 5 |
| Diverse Professional Opportunities | 1 | 0 | 1 | 1 | 0 | 0 | 0 | x | 3 |
| | | | | | | | | | 28 |

Individual 3

| | Leadership Opportunities | Emphasis on Self-Reflection | Self-Teaching Opportunities | Career Preparation | Protected Education Time | Professional Identity Development | Culture of Feedback | Diverse Professional Opportunities | Row total |
|---|---|---|---|---|---|---|---|---|---|
| Leadership Opportunities | x | | 1 | 1 | 1 | 1 | 1 | 1 | 1 | 7 |
| Emphasis on Self-Reflection | 0 | x | x | 0 | 0 | 0 | 0 | 0 | 0 |
| Teaching Opportunities | 0 | 1 | | x | 1 | 1 | 1 | 1 | 1 | 6 |
| Career Preparation | 0 | 1 | 0 | | | 0 | 0 | 0 | 0 | 1 |
| Protected Education Time | 0 | 1 | 0 | 1 | | x | 0 | 1 | 1 | 5 |
| Professional Identity Development | 0 | 1 | 0 | 1 | 0 | | x | 1 | 0 | 2 |
| Culture of Feedback | 0 | 1 | 0 | 1 | 0 | 1 | | 1 | 4 |
| Diverse Professional Opportunities | 0 | 1 | 0 | 1 | 0 | 1 | 0 | x | 3 |
| | | | | | | | | | 28 |

Figure 8

Individual 1

| | Leadership Opportunities | Emphasis on Self-Reflection | Teaching Opportunities | Career Preparation | Protected Education Time | Professional Identity Development | Culture of Feedback | Diverse Professional Opportunities | Row sum | Priorities | |
|---|---|---|---|---|---|---|---|---|---|---|---|
| Leadership Opportunities | 1 | 0.25 | 3 | 3 | 3 | 6 | 2 | 0.333333333 | 2 | 17.58 | 13.34% |
| Emphasis on Self-Reflection | 4 | 1 | 3 | | 2 | 5 | 2 | 2 | 2 | 21.00 | 15.93% |
| Teaching Opportunities | 0.333333333 | 0.333333333 | 1 | | 0.25 | 0.5 | 0.125 | 0.125 | | 2.78 | 2.11% |
| Career Preparation | 0.333333333 | 0.5 | 4 | | 1 | 2 | 0.5 | 0.25 | 3 | 11.58 | 8.79% |
| Protected Education Time | 0.166666667 | 0.2 | 2 | 0.5 | | 1 | 0.166666667 | 0.333333333 | | 4.53 | 3.44% |
| Professional Identity Development | 0.5 | 0.5 | 8 | 2 | 6 | | 1 | 4 | 0.142857143 | 22.14 | 16.80% |
| Culture of Feedback | 3 | 0.5 | 9 | 4 | 6 | | 0.25 | 1 | 8 | 31.75 | 24.08% |
| Diverse Professional Opportunities | 0.5 | 0.5 | 8 | 0.333333333 | 3 | 7 | 0.125 | | 1 | 20.46 | 15.52% |
| | | | | | | | | | 131.83 | 100.00% | |

Individual 2

| | Leadership Opportunities | Emphasis on Self-Reflection | Teaching Opportunities | Career Preparation | Protected Education Time | Professional Identity Development | Culture of Feedback | Diverse Professional Opportunities | Row sum | Priorities | |
|---|---|---|---|---|---|---|---|---|---|---|---|
| Leadership Opportunities | 1 | 0.5 | 2 | 2 | 0.5 | 2 | 2 | 0.25 | 0.5 | 8.75 | 9.34% |
| Emphasis on Self-Reflection | 2 | 1 | 2 | 2 | 4 | 2 | 2 | 0.5 | 3 | 16.50 | 17.62% |
| Teaching Opportunities | 0.5 | 0.5 | 1 | 1 | 0.25 | 0.5 | 0.125 | 0.25 | 0.5 | 3.83 | 4.09% |
| Career Preparation | 2 | 0.25 | 4 | | 1 | 0.333333333 | 0.5 | 2 | 2 | 13.75 | 14.68% |
| Protected Education Time | 0.5 | 0.5 | 2 | | | | 0.25 | 0.5 | 0.25 | 5.50 | 5.87% |
| Professional Identity Development | 0.5 | 0.5 | 3 | | 4 | | 1 | 0.25 | 2 | 13.25 | 14.15% |
| Culture of Feedback | 4 | 2 | 4 | 0.5 | 2 | 4 | | 1 | 4 | 21.50 | 22.95% |
| Diverse Professional Opportunities | 2 | 0.333333333 | 2 | 0.5 | 4 | 0.5 | | 0.25 | 1 | 10.98 | 11.30% |
| | | | | | | | | | 93.67 | 100.00% | |

Individual 3

| | Leadership Opportunities | Emphasis on Self-Reflection | Teaching Opportunities | Career Preparation | Protected Education Time | Professional Identity Development | Culture of Feedback | Diverse Professional Opportunities | Row sum | Priorities | |
|---|---|---|---|---|---|---|---|---|---|---|---|
| Leadership Opportunities | 1 | 0.125 | 8 | 5 | 6 | 7 | 2 | 0.166666667 | 0.5 | 22.79 | 12.57% |
| Emphasis on Self-Reflection | 8 | 1 | 9 | 9 | 7 | 7 | 2 | 0.5 | 7 | 41.50 | 22.89% |
| Teaching Opportunities | 0.166666667 | 0.111111111 | 1 | 1 | 0.125 | 3 | 0.125 | 0.111111111 | 0.125 | 4.76 | 2.63% |
| Career Preparation | 0.166666667 | 0.142857143 | 8 | | 1 | 6 | 2 | 2 | 8 | 25.43 | 14.03% |
| Protected Education Time | 0.142857143 | 0.142857143 | 0.333333333 | 0.166666667 | | 1 | 0.125 | 0.125 | 0.5 | 2.54 | 1.40% |
| Professional Identity Development | 0.5 | 0.5 | 8 | 2 | 0.5 | | 1 | | 0.25 | 6 | 24.75 | 13.65% |
| Culture of Feedback | 6 | 2 | 9 | 8 | 8 | 4 | | | 1 | 8 | 46.00 | 25.37% |
| Diverse Professional Opportunities | 2 | 0.142857143 | 8 | 0.125 | 2 | 0.166666667 | 0.125 | | 1 | 13.56 | 7.48% |
| | | | | | | | | | 181.34 | 100.00% | |

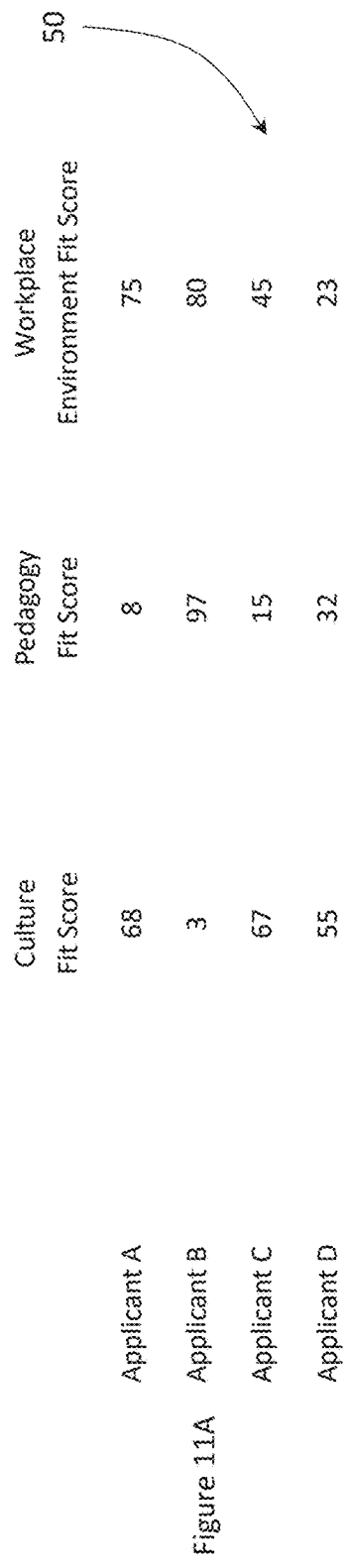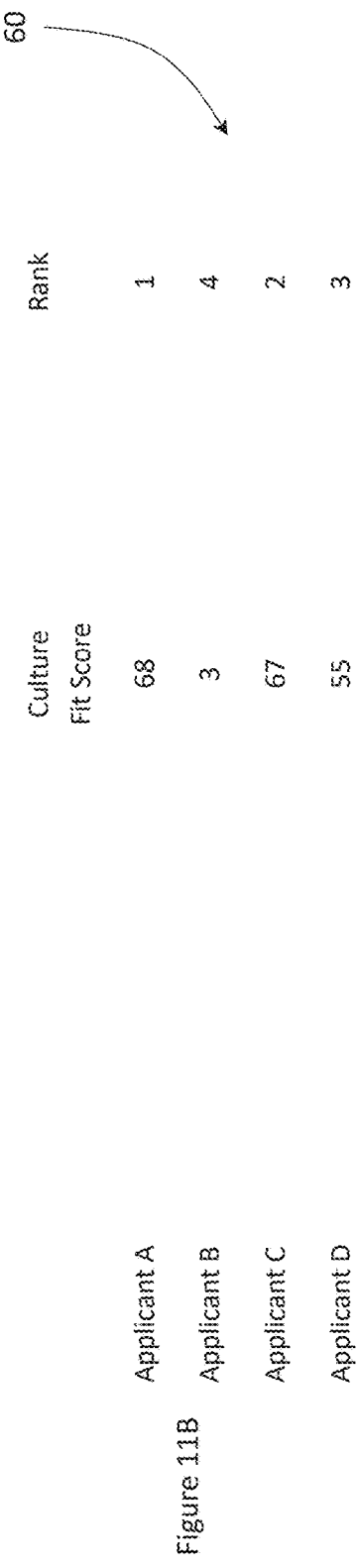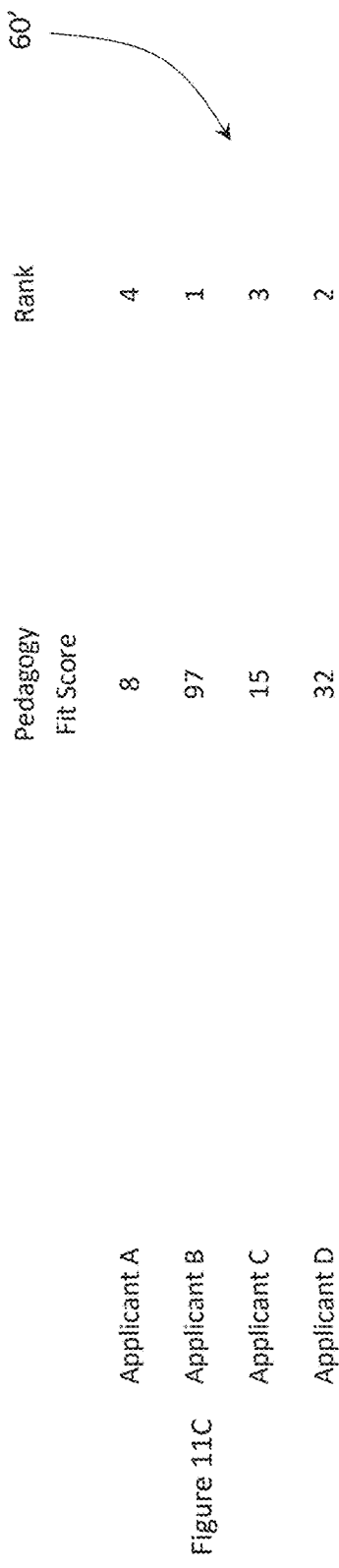

Figure 11D

| | Culture Fit Score | Pedagogy Fit Score | Workplace Environment Fit Score | Average Fit Score | Rank |
|---|---|---|---|---|---|
| Applicant A | 68 | 8 | 75 | 50.33 | 2 |
| Applicant B | 3 | 97 | 80 | 60.00 | 1 |
| Applicant C | 67 | 15 | 45 | 42.33 | 3 |
| Applicant D | 55 | 32 | 23 | 36.67 | 4 |

| | Culture Fit Score | Pedagogy Fit Score | Workplace Environment Fit Score | Weighted Average Fit Score | Rank |
|---|---|---|---|---|---|
| Weighting | 2 | 1 | 1 | | |
| Applicant A | 68 | 8 | 75 | 54.75 | 1 |
| Applicant B | 3 | 97 | 80 | 45.75 | 3 |
| Applicant C | 67 | 15 | 45 | 48.50 | 2 |
| Applicant D | 55 | 32 | 23 | 41.25 | 4 |

60‴

PROGRAM ASSESSMENT AND MATCHING SYSTEM

CROSS REFERENCE TO RELATED APPLICATION

The application claims the benefit of and priority to U.S. patent application Ser. No. 17/451,724 entitled PROGRAM ASSESSMENT AND MATCHING SYSTEM filed Oct. 21, 2021 and Canadian patent application no. 3,135,227 entitled PROGRAM ASSESSMENT AND MATCHING SYSTEM filed Oct. 21, 2021, the contents of which are hereby incorporated by reference.

FIELD

The improvements generally relate to the field of computers, interfaces, distributed systems, and signal processing. In an aspect, the improvements relate to distributed computer systems for program assessment and matching applicants to programs.

INTRODUCTION

When applicants apply for positions in a plurality of potential programs, e.g. educational programs, such as medical school, residency or law school, each program has the difficult task of ranking the applicants according to their qualifications, e.g. experience, marks, and so on. However, deciding whether an applicant is a good fit for the program may not easily be determined simply by how well they did in school or at their last job. Within some complex position-filling systems, the concept of "fit" may be highly sought after, but poorly defined or measured. For example, within higher education, current methods of assessing fit, e.g. data culled from personal statements, reference letters, in-person and/or virtual interviews, typically lack standardization, encourage disingenuity, and expend a great deal of human resources.

There exists a need for computer systems and methods for program assessment and matching applicants to programs, or at least an alternative.

SUMMARY

Embodiments described herein relate to a computer implemented program assessment system for ranking applicants for positions in desired programs, and in particular to a computer implemented system and method for assessing and matching applicants to programs based on the applicant's and the program's ranking of a plurality of characteristics in a plurality of categories.

Embodiments described herein relate to a program assessment system for ranking applicants for positions in desired programs, and in particular to a computer implemented system and method for assessing and matching applicants to programs based on the applicant's and the program's ranking of a plurality of characteristics in a plurality of categories.

Embodiments described herein relate to computer implement systems and methods that can provide quantitative measures of strength of alignment that are standardized, reliable, and defensible for position-filling decision-making, and providing guidance for productive changes to future iterations to enhance user goals. In particular, embodiments described herein relate to providing a computer implemented comparison assessment system that requires input from both the applicants and representatives of the programs results in fit scores, which may be used to generate an overall ranking of applicants for each program, and a ranking of programs for each applicant, as well as useful internal data for programs to inform and guide their unique mission statements.

In an aspect, embodiments described herein provide systems and processes for a computer implemented method comprising: providing, by a processor, one or more first graphic user interfaces configured to enable each of a plurality of applicants to enter a respective first prioritized list of a first plurality of characteristics in a first category relating to one or more positions offered by each of a plurality of programs into which the plurality of applicants wish to apply; providing, by the processor, one or more second graphic user interfaces configured to enable one or more representatives of each of the plurality of programs to enter a second prioritized list of the first plurality of characteristics in the first category; determining, by the processor, a first ranked correlation between each first prioritized list and each second prioritized list; generating, by the processor, a corresponding first fit score for each of the plurality of applicants for each of the plurality of programs based on the first ranked correlations; generating, by the processor, for each of the plurality of programs, a corresponding ranked list of the applicants that applied thereto, based on the corresponding first fit scores; sending the corresponding first fit score to each of the plurality of applicants for each of the plurality of programs that they applied to; and sending the corresponding ranked list of the applicants to each of the plurality of programs.

In another aspect, there is provided a computing apparatus for providing a program assessment comprising: a first processor; and a first memory storing instructions that, when executed by the processor, configure the computing apparatus to: provide one or more first graphic user interfaces configured to enable each of a plurality of applicants to enter a respective first prioritized list of a first plurality of characteristics in a first category relating to one or more positions offered by each of a plurality of programs into which the plurality of applicants wish to apply; provide one or more second graphic user interfaces configured to enable one or more representatives of each of the plurality of programs to enter a second prioritized list of the first plurality of characteristics in the first category; determine a first ranked correlation between each first prioritized list and each second prioritized list; generate a corresponding first fit score for each of the plurality of applicants for each of the plurality of programs based on the first ranked correlations; generate for each of the plurality of programs, a corresponding ranked list of the applicants that applied thereto based on the corresponding first fit scores; send the corresponding first fit score to each of the plurality of applicants for each of the plurality of programs that they applied to; and send the corresponding ranked list of the applicants to each of the plurality of programs.

Embodiments described herein provide non-transitory computer readable memory having recorded thereon statements and instructions for execution by a hardware processor to carry out operations of processes described herein.

Embodiments described herein provide a computer system for assessments. The system has a plurality of client web applications comprising an applicant portal and a program portal. The system has a plurality of application services comprising a category application programming interface service, a correlation application programming interface service, a scoring application programming interface service, a ranking application programming interface service, an administrator application programming interface service, and account application programming interface service. The system has an application programming interface gateway to transmit messages and exchange data between the plurality of client web applications and the plurality of application services. The system has a memory and a hardware processor coupled to the memory programmed with executable instructions, the instructions configuring the processor with a plurality of domain services comprising a category service, a correlation service, a scoring service, a ranking service, an administrator service, and account service. The system has a message queue service for coordinating messages between the plurality of application services and the plurality of domain services. The applicant portal is configured with one or more first graphic user interfaces configured to enable each of a plurality of applicants to enter a respective first prioritized list of a first plurality of characteristics in a first category relating to one or more positions offered by each of a plurality of programs into which the plurality of applicants wish to apply. The program portal is configured with one or more second graphic user interfaces configured to enable one or more representatives of each of the plurality of programs to enter a second prioritized list of the first plurality of characteristics in the first category. The category service and the category application programming interface service generate the first plurality of characteristics in the first category. The correlation service and the correlation application programming interface service determine a first ranked correlation between each first prioritized list and each second prioritized list. The scoring service and the scoring application programming interface service generate a corresponding first fit score for each of the plurality of applicants for each of the plurality of programs based on the first ranked correlations. The ranking service and the ranking application programming interface service generate a corresponding ranked list of the applicants that applied thereto, based on the corresponding first fit scores. A notification service transmits the corresponding first fit score to the applicant portal for each of the plurality of programs that they applied to, and transmits the corresponding ranked list of the applicants to the program portal.

In some embodiments, the application services and domain services are implemented by at least one physical machine and at least one worker node, the physical machine providing a plurality of virtual machines corresponding to the plurality of application services, the worker node providing core compute resources and serve functions for the application services and the domain services.

In some embodiments, the system has an auto-scaling cluster with a control plane network for an auto-scaling controller node group and a data plane network for an auto-scaling worker node group, the control plane network being a set of services running on nodes that communicate with worker nodes of the auto-scaling worker node group, the data plane network providing communication between the services and implementing functionality of the services, wherein the auto-scaling cluster scales nodes of the groups in response to requests by the application services and the domain services, wherein the worker nodes of the worker node group provide core compute resources and serve functions of the services.

In some embodiments, the system has an authentication service, wherein the applicant portal authenticates the applicant using the authentication service prior to receiving input data.

Many further features and combinations thereof concerning embodiments described herein will appear to those skilled in the art following a reading of the instant disclosure.

DESCRIPTION OF THE FIGURES

Some example embodiments will be described in greater detail with reference to the accompanying drawings, wherein:

FIG. 6 illustrates a table of total scores for each characteristic in a category for a plurality of representatives from a program, for paired comparison analysis without sliding scale;

FIG. 8 illustrates a table of total scores for each characteristic in a category for a plurality of representatives from a program, when using sliding scale;

FIG. 11A illustrates a list of applicants and their fit scores;

FIG. 11B illustrates the list of applicants of FIG. 11A ranked according to a first criteria, culture fit score;

FIG. 11C illustrates the list of applicants of FIG. 11A ranked according to a second criteria, pedagogy fit score;

FIG. 11D illustrates the list of applicants of FIG. 11A ranked according to a third criteria, average fit score; and FIG. 11E illustrates the list of applicants of FIG. 11A ranked according to a fifth criteria, weighted fit score.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art.

Figure 1:
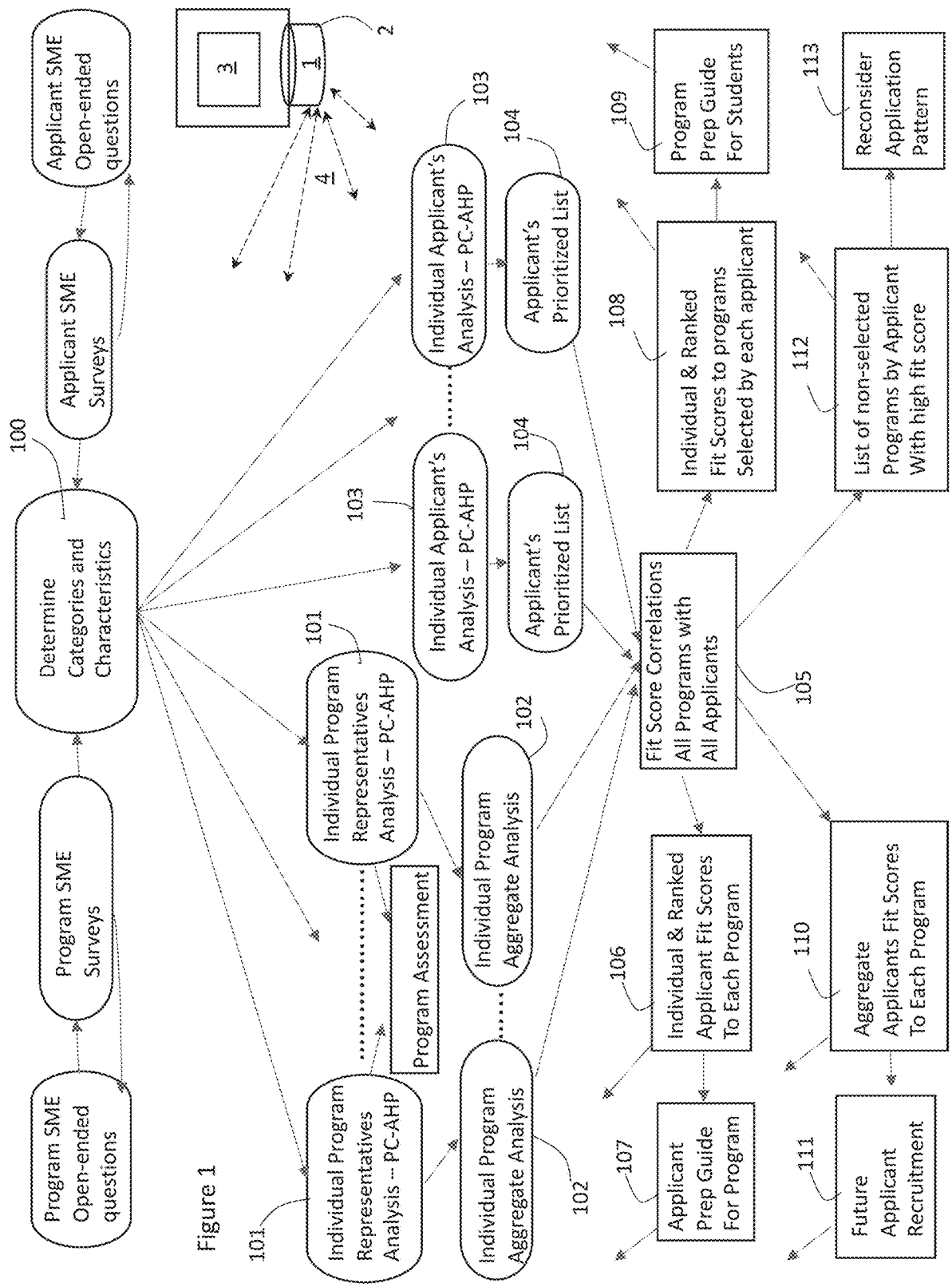
FIG. 1 is a flow chart in accordance with an assessment system of the present disclosure.

In accordance with an example embodiment, illustrated in FIG. 1, an assessment system 1 may involve automatically generating comparison assessments designed to help identify applicants that most closely align with a program's values and priorities, and with insight towards which applicants may be more likely to accept an offer for a position in their program. The assessment system 1 may be implemented in computer hardware with a software application having instructions stored on non-transitory memory 2 and executable by a controller processor 3, and accessible via a network 4, such as the Internet. The program may be an educational program, such as a medical school, a residency program or a law school, or an employment position. Even though every applicant may not apply for the positions at every program, the assessment system 1 uses computer hardware to generate for each program a ranked list of applicants, who have applied for the positions at that program, based on a single comparison assessment taken by every applicant and every program.

As an optional preliminary step, a list of the categories and a list of the characteristics for each category that both applicants and the programs most value, may be created by the assessment system 1 based on what one or more representatives of the program and/or one or more sample applicants consider to be the priorities and values. A structured method of communication may be conducted with representatives of both groups; these representatives can be considered the Subject Matter Experts (SMEs) for the closed environment being addressed. As an example, if the closed environment comprises graduating medical students as Applicants, and United States graduate medical education (US-GME) residency training programs as programs, then two sets of SMEs may be drawn-one from among graduating medical students and one from among representatives of US-GME residency training programs. In open-ended questions, both sets of SMEs may be asked to suggest characteristics (priorities/values/characteristics) they feel important for decision-making. For applicants, what priorities guide their preferences of program; for programs what priorities guide their preference of applicants. Open-ended responses are collated. All characteristics identified by at least a threshold amount, e.g. 50%-60%, preferably 59%, of either of the two sets of SMEs are qualitatively reviewed to combine into thematic categories. A subsequent survey is sent out to the two sets of SMEs to identify, from the surviving characteristics, those that are either duplicative or unhelpful for decision-making purposes. After a second qualitative analysis of this second round of SME feedback, a final set of categorized characteristics may be produced for the specific closed environment being addressed. For example, there can be 2-5 categories with each category having 5-8 characteristics.

By selecting the categories (or themes) and the characteristics each program most values and offers, the assessment system 1 may create a prioritized list of characteristics based on what each program consider to be the priorities and values of the corresponding program in its current state. The prioritized lists of characteristics, based on perceptions of the program's representatives, may be used to calculate the average or overall final prioritized list of characteristics for the program's priorities and values.

The final prioritized list of characteristics for each program may then be compared to each of the applicant's corresponding prioritized lists. The comparison will determine how closely the values and program offerings align to those of all the applicants' values and preferences across a plurality of themes or categories, e.g. work environment, training methods, pedagogy, and culture.

The assessment system 1 compares a total plurality of characteristics when summing across all categories (such as the following example ranges: 5-30, 6-24, 8-21) or across a plurality of categories or themes (such as the following example ranges: 2-8, 2-5, 3) with each category having a plurality of characteristics within that category (such as the following example ranges: 4-10, 5-9, 6-8). The assessment system 1 generates a plurality of separate assessment or "fit" scores measuring the alignment between each program and each of the applicants, i.e. one fit score for each theme for each program.

With reference to FIG. 1, after the categories (themes) and characteristics have been determined (or received as input), in step 100, e.g. as above described, a first assessment step 101 is executed, wherein a set program representative devices (such as the following example ranges: 1-20, 5-15, 8-12) of each program may each provide assessment input data. For example, there may be at least 5 programs, or more than 10 programs. Each program can have 5 or more spots to fill with applicants, such as about 5-250 spots or about 5-20 spots or positions. There may be at least 500 applicants, or more than 1000 applicants, and sometimes more than 2000 applicants for each program; however, each applicant may only be applying for positions at selected programs, i.e. may not be applying for positions at all of the programs.

There may be a single category (theme) or a plurality of categories (themes) of comparisons, for example: Culture, Training methods, i.e. Pedagogy, and Work Environment, depending on the type of programs and positions. For each category, input data for the plurality of related characteristics may rank the characteristics in order of priority. Culture may be defined as the persisting ethical, collaborative, and psycho-emotional characteristics of a given program. Training methods or Pedagogy may be defined as the teaching and learning methodologies of a given program. Work Environment may be defined as the specific work conditions and setting in which trainees will perform their service. Other categories (themes) are within the scope of the invention depending on the type of programs and positions.

Figure 2:
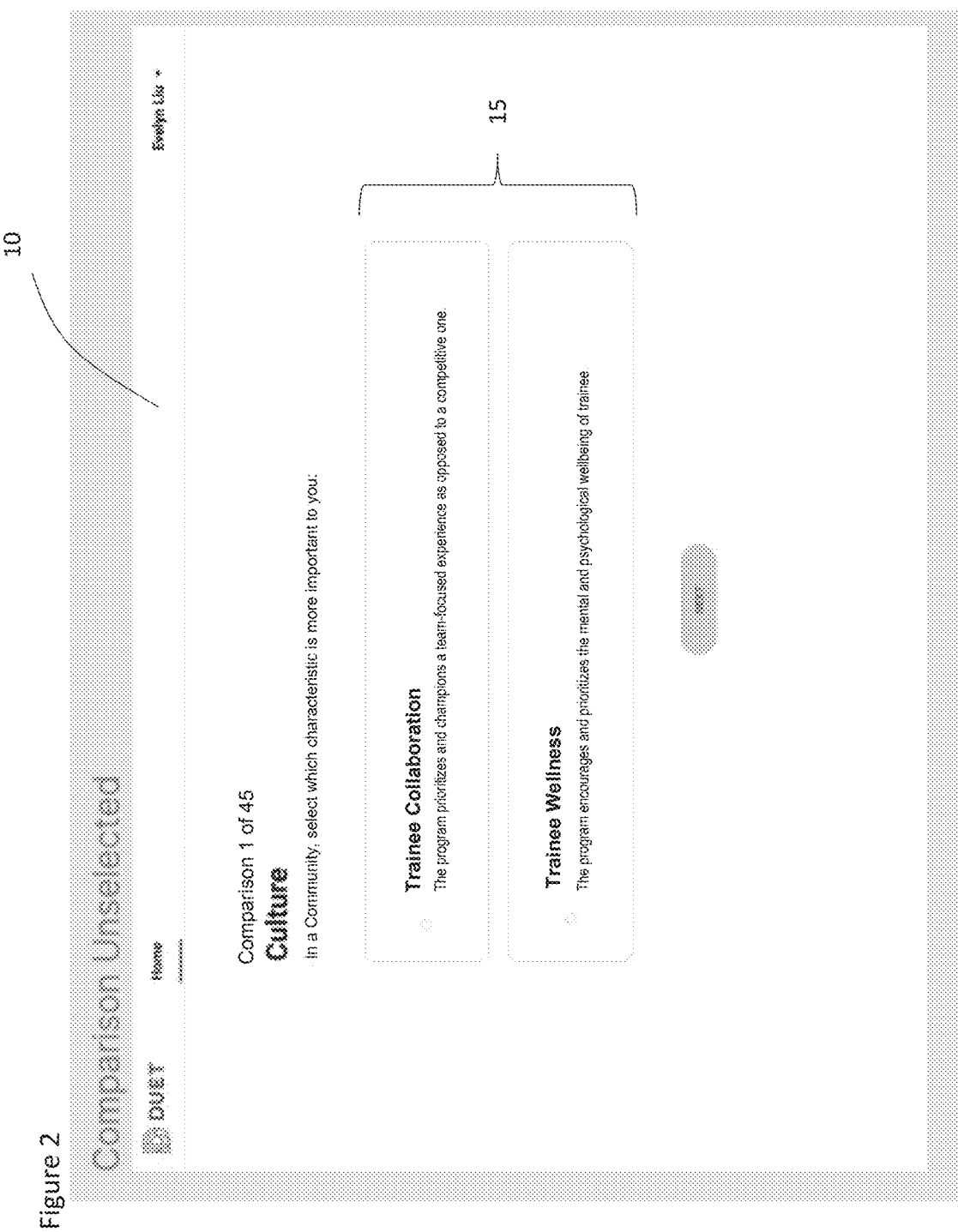
FIG. 2 illustrates a paired comparison question on a graphic user interface of the assessment system of FIG. 1.

With reference to FIG. 2, the assessment system 1 may provide a graphic user interface 10, whereby the controller processor 3 via the software application is configured to generate visual elements that illustrate the characteristics for each category (theme) two at a time e.g. a paired comparison assessment 15. The graphic user interface 10 may be accessed via a local area network or via the internet, e.g. via an application on a computer or a smart device. Each representative device may provide input data of a selected characteristic that indicates what the program values more between the two. The software application of the assessment system 1 presents each representative device a series of pairs of characteristics, which each representative device then selects their higher-ranking characteristic. The assessment system 1 comprises forced-choice comparisons and may include sliding scales. Each representative device may then provide further input data to rank the three themes or categories in relation to one another.

Figure 3:
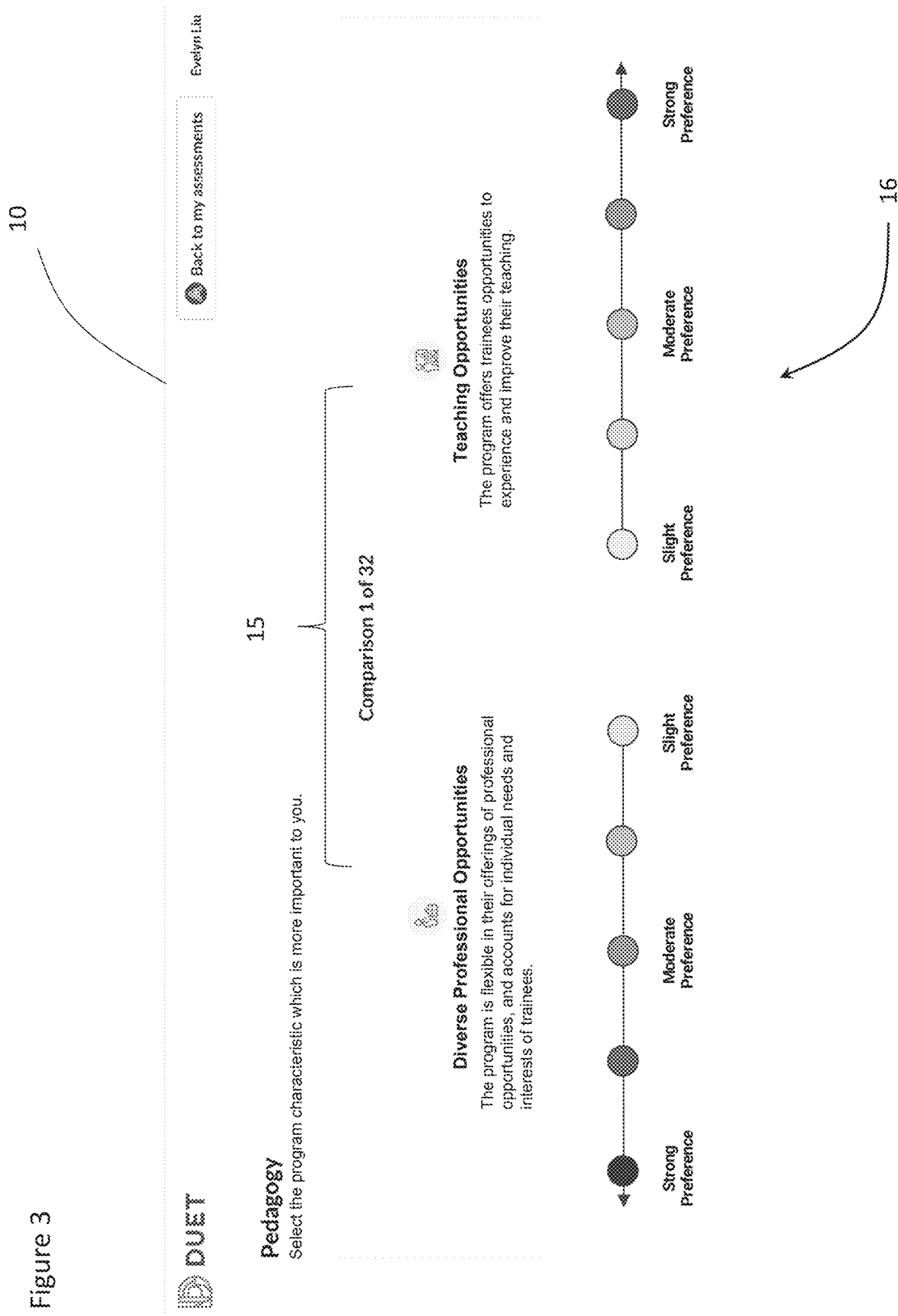
FIG. 3 illustrates a paired comparison question with a sliding scale on a graphic user interface of the assessment system of FIG. 1.
Figure 4:
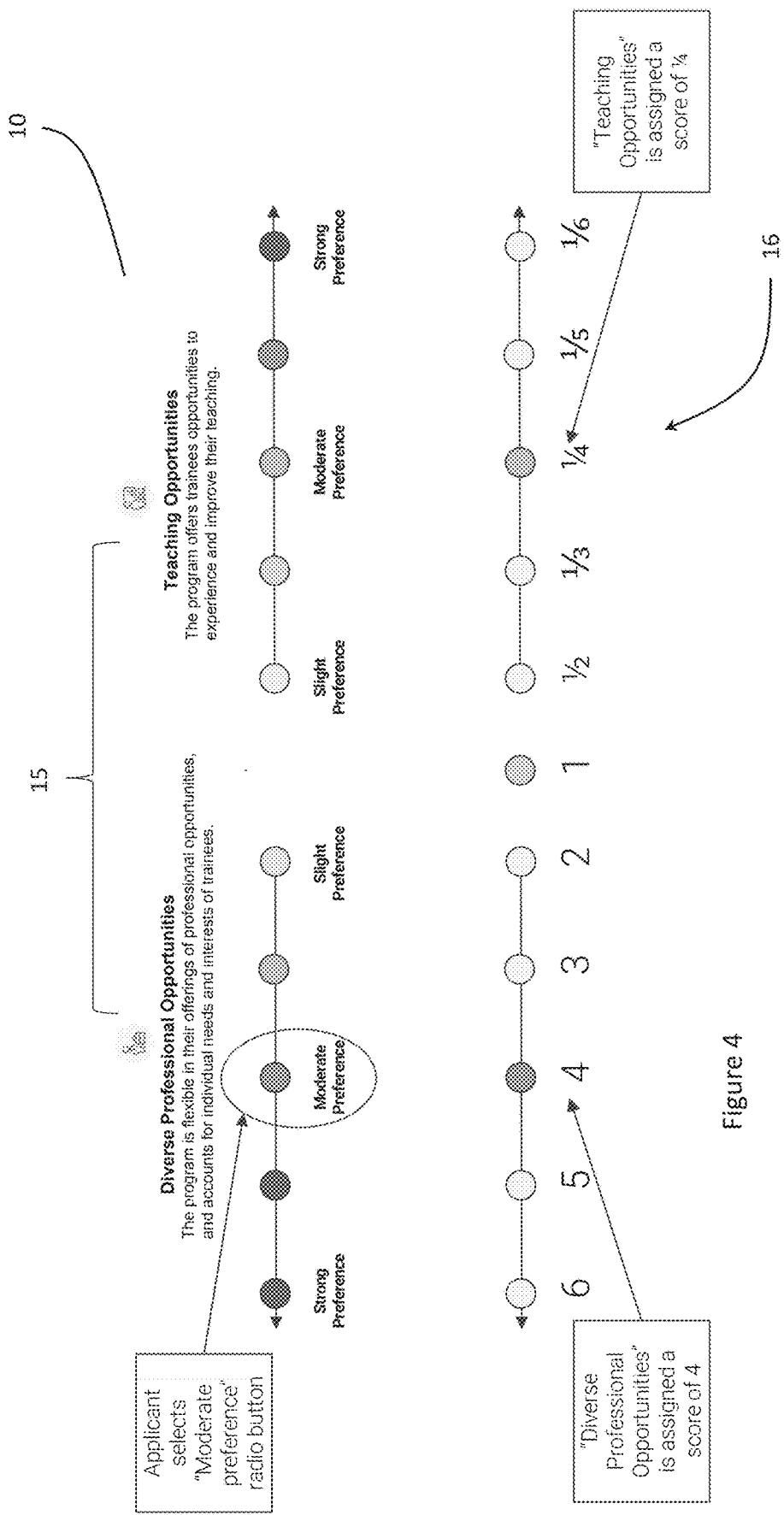
FIG. 4 illustrates the paired comparison question of with a sliding scale of FIG. 3 with exemplary scores.
Figure 5:
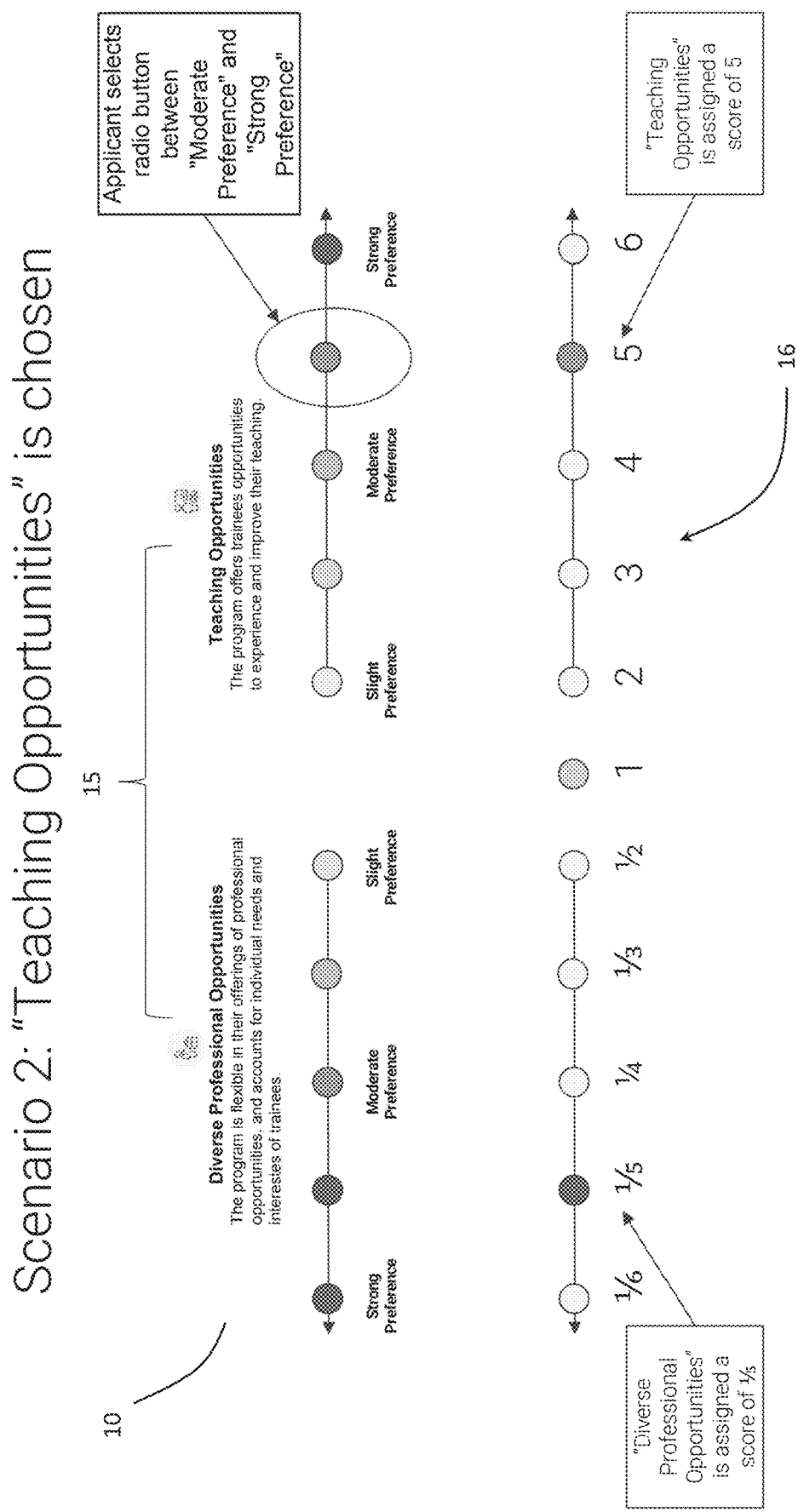
FIG. 5 illustrates the paired comparison question of with a sliding scale of FIG. 3 with exemplary scores.

With reference to FIGS. 3-5, in an alternative example of step 101, the assessment system 1 may provide the graphic user interface 10, whereby the controller processor 3 via the software application of the assessment system 1 is configured to illustrate the characteristics two at a time e.g. the paired comparison assessment 15, but with a scaled response 16 comprising a plurality of varying degrees of preference, e.g. from a slight preference to a strong preference with one or a plurality of intermediate or moderate preferences there between, such as an adaptation of the Analytic Hierarchy Process (AHP) developed by Thomas L. Saaty. An application of the AHP is a multi-step process for each paired comparison, and is conducted using a 9-point Likert scale, which allows a neutral answer. To reduce resource intensity and time, while ensuring accuracy and an honest answer, the scale can have 3-7 different degrees of preference, or 5 degrees (in some examples), and the neutral answer, e.g. 1, may be eliminated. The selected answer may be given a value based on the degree of preference, from a minimum value, e.g. 2, for slight preference to a maximum value, e.g. 6, for strong preference. The corresponding degree of preference for the unselected answer may be given a value, e.g. the inverse of the value of the selected answer. For example, with reference to FIG. 4: if the representative selects a moderate preference, the answer may be awarded a score of 4, while the corresponding unselected answer may be awarded a score of ¼. Similarly, with reference to FIG. 5: if the representative selects a moderately strong preference, the answer may be awarded a score of 5, while the corresponding unselected answer may be awarded a score of ⅕. All Applicants must fully complete all paired comparisons; a plurality of program representatives must do the same, with tags assigned to any subsets of program representatives, at the discretion of the program, e.g. a US-GME residency training program may wish to see relative alignment structures of identifiable subsets of resident trainees versus faculty representatives. If there are X categories (e.g. 2-5) and N priorities within each category (e.g. 5-8), the number of permutations required forced comparisons of factors and of categories are X (N*(N−1)/2) and X (X−1)/2 respectively.

Figure 7:
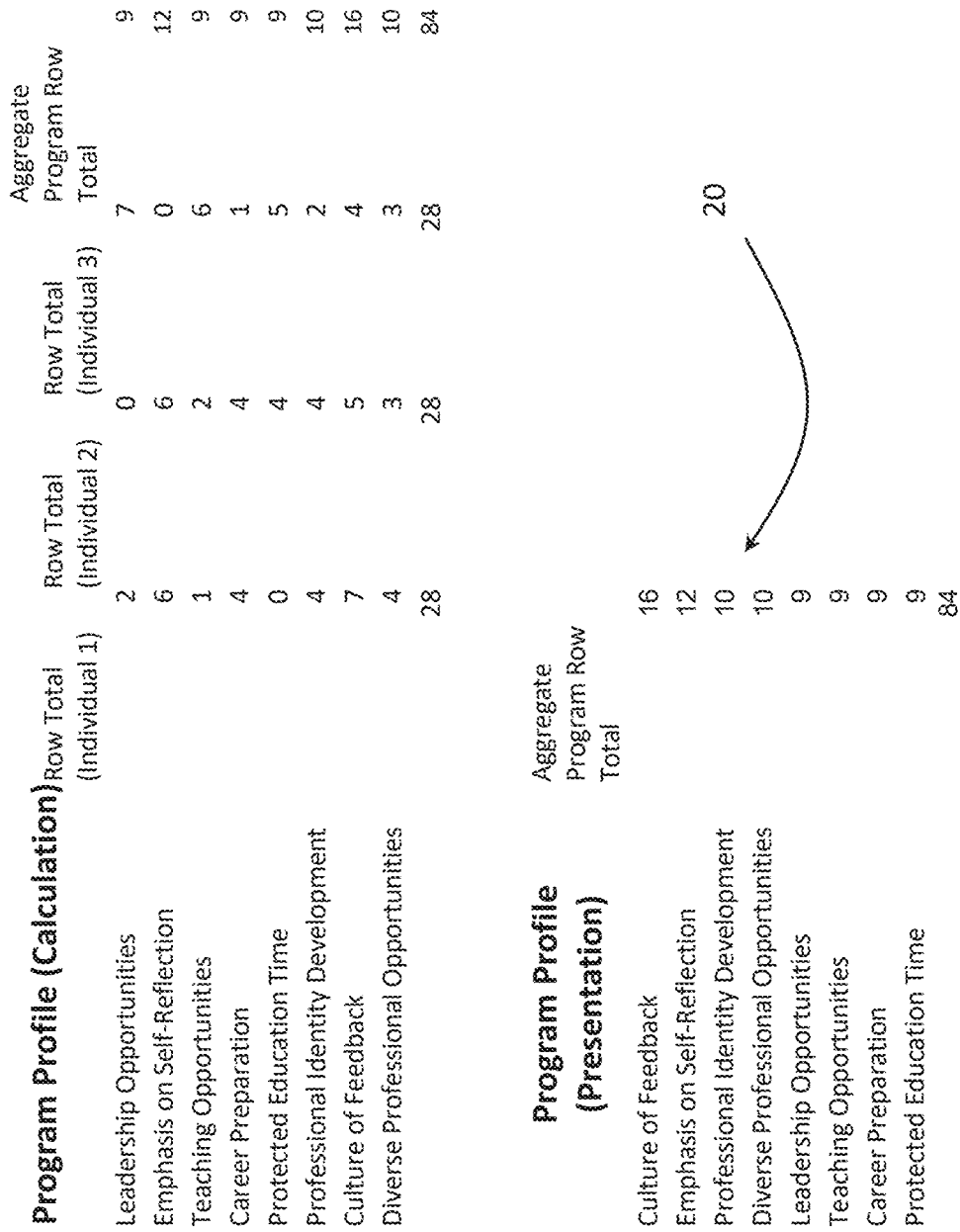
FIG. 7 illustrates a table of total overall scores for obtaining an overall total score for the program and an overall prioritized list of characteristics for the program, for paired comparison analysis without sliding scale.

With reference to FIG. 6, in a first example step 102 the assessment system 1, using paired comparison without sliding scale, may then receive, store and tabulate the result of each paired comparison assessment 15 for each combination of characteristics resulting in a total score for each characteristic up to N−1, e.g. 7, where N is the number of characteristics, e.g. 8, and a total of N (N−1)/2 points, e.g. 28, awarded. The step 102 may be conducted for each category and for each representative, e.g. Individual 1, Individual 2 and Individual 3. With reference to FIG. 7, the assessment system 1 may then tabulate and compile a total overall score for each characteristic for the program by adding the total score from each characteristic for each representative. A program's overall prioritized list of characteristics 20 may then be generated by the assessment system 1 based on the individual total scores of each characteristic for each representative.

The program's overall prioritized list of characteristics 20 may be an average of the total scores or ranks of each representative or by some other means, e.g. weighted averages, in which selected representatives may have more influence on the final prioritized list. The first step 101 and/or the second step 102 may be repeated a plurality of times, e.g. for each category, for each representative, and for each of the plurality of programs participating.

With reference to FIG. 8, in an alternative step 102 the assessment system 1 may then receive, store and tabulate the result of each paired comparison assessment 15 based on the scaled responses 16 (See FIGS. 3-5) for each combination of characteristics resulting in a total score for each characteristic. However, since the amount of total points awarded for each category may vary, simply averaging the total scores for each characteristic may not generate an accurate representation. Accordingly, a percentage of the total score for each characteristic to the total points awarded for all of characteristics in the entire category may be calculated by the assessment system 1 for each of the characteristics and for each representative, and a prioritized list of characteristics is generated based on the percentages, e.g. highest to lowest. The step 102 may be conducted for each category and for each representative, e.g. Individual 1, Individual 2 and Individual 3. Using this sliding scale method, the sum total of points awarded to all characteristics within a single category must add up to 100%.

In some example, system 1 can use row sums for program representatives or priority eigenvectors. The weight of a characteristic for a program within any given category can be calculated by averaging the weights assigned by the program representatives who completed the input (e.g. which can include row sums being calculated for each individual).

Figure 9:
FIG. 9 illustrates a table of total overall scores for obtaining an overall total score for the program and an overall prioritized list of characteristics for the program, when using sliding scale.

With reference to FIG. 9, the assessment system 1 may then tabulate and compile a total overall score (percentage) for each characteristic for the program based on the total score (percentage) from each characteristic for each representative, e.g. a total of all actual scores from each characteristic from each representative divided by the total of all of the total points awarded for all of the characteristics and all of the representatives. A program's overall prioritized list of characteristics 20 may then be generated by the assessment system 1 based on the total scores and total points or aggregated individual percentages from each representative.

At step 103, before, after or simultaneously with the first step 101 and the second step 102, each applicant device may then be provided access to the assessment system 1 via a graphic user interface 10, as hereinbefore described, to complete the assessment, e.g. a paired comparison assessment 15 binary or scaled, designed to help identify the alignment between the applicants' and the programs' values and priorities. As above, there may be at least 500 applicants, and often more than 1000 applicants for each program. Each applicant may apply to only a select number of programs based on their choice or on a predetermined maximum.

By ranking each applicant's characteristics across the one or more categories (themes), the assessment system 1 may calculate the alignment between each applicant and each program based on the one or more categories (themes), e.g. work environment, culture and training methods (pedagogy). The assessment system's comparison may determine how closely the values and preferences of each applicant align to the values and preferences of the programs they are applying to in a more objective way, while more efficiently using computing resources.

Each applicant ideally only completes the assessment once, which may take time (e.g. about 10-30 minutes, 15-20 minutes) to complete. Each applicant may be provided more or less time than the representatives or the applicants and the representatives may be given an unlimited amount of time to complete the assessment.

As above, there may be the plurality of themes or categories of comparisons, e.g. Culture, Training Methods, Pedagogy, and Work Environment. For each category, time is taken to read the definitions of the plurality of related characteristics.

As above, the assessment system 1 may provide the characteristics to each applicant device via a graphic user interface 10, two at a time, e.g. forced choice, whereby each applicant device may select the characteristic and/or degree of preference that they prefer or value more between only two choices. A warning and/or a time restriction may be implemented when an applicant exceeds a threshold amount of time to answer.

Finally, the one or more, e.g. three, themes or categories may be ranked by each applicant in relation to one another.

Figure 10A:
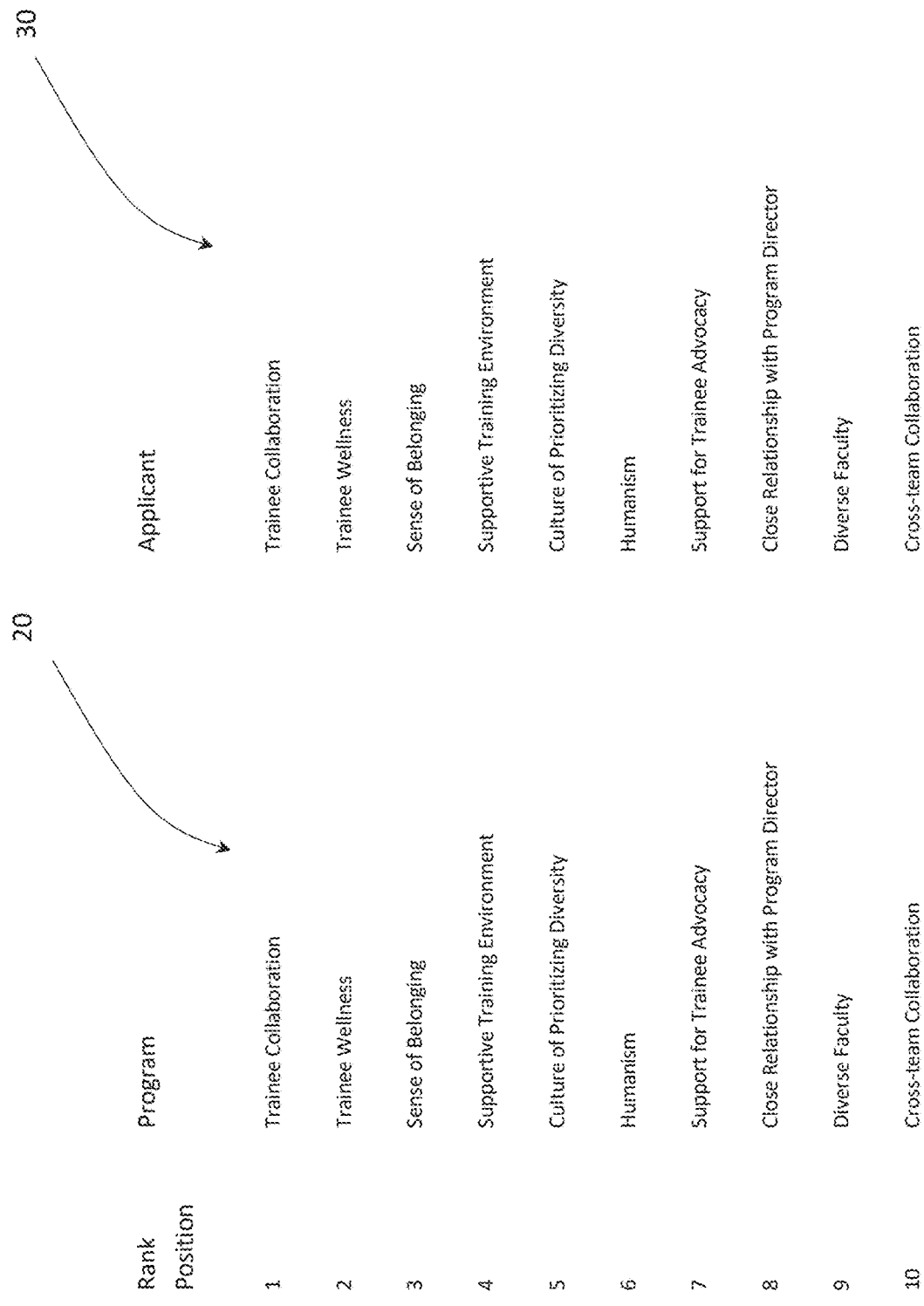
FIG. 10A illustrates a characteristic comparison, using paired comparison analysis without sliding scale, resulting in a fit score of 100 indicating that the applicant has ranked all characteristics in the exact same order as the program rating.

After each applicant has completed the assessment, a prioritized list of characteristics 30 for each category (theme), (FIG. 10A) may be compiled, at a fourth step 104, according to the selections provided by each applicant. Based on how they selected between all of the pairwise comparisons, each applicant will get a prioritized list of the characteristics 30 within each theme, from most important to least important.

The third step 103 and the fourth step 104 may be repeated a plurality of times, e.g. once for each category (theme), and once for each of the plurality of applicants participating.

For each applicant, a "fit" score may then be calculated by the controller processor 3 via the software application of the assessment system 1, in step 105, for each theme for each program they're applying to and preferably each and every program, as described herein after. Each fit score may be calculated by comparing their ranking of the characteristics, i.e. applicant's prioritized list of characteristics 30, within each theme to each program's overall ranking, e.g. program's prioritized list of the characteristics 20 within that category (theme).

The comparison for the "fit" scores may utilize Spearman's or Kendall's rank correlation coefficient for paired comparison analysis done without sliding scale, Pearson's correlation when done with sliding scale, or any other suitable rank correlation method. Another example can use Euclidean distance.

In step 106, the assessment system 1 may send, whereby each program's representative device may receive a list 50 including each individual fit score, for each theme, for each applicant that applied to their program, e.g. "Fit: Culture", "Fit: Pedagogy", and "Fit: Work Environment", and/or an overall fit score. At step 107, a ranked list 60 of all applicants interested in the program, whereby each program's representative device may be provided in a compiled list in a particular order, e.g. descending overall fit score, as detailed herein below, in a Prep guide.

All other data collected, e.g. the actual rank of the characteristics within each theme, the ranking of the three themes, may or may not be shared with the programs, at step 110, and research may be conducted on this data to determine where else the programs or the applicants may find meaning and value, and provided to each program for future applicant recruitment, at step 111.

In step 108, the assessment system 1 may send, whereby each applicant device may receive each individual fit score for each category for each program they applied to. Each applicant device may also receive, at step 109, a compiled and sorted list of all programs they applied to in order of average fit score and/or in order of adjusted fit score based on the adjusted fit score calculation provided by the program. As well, the applicant device may receive a list of programs to which they did not apply, but which ranked most highly in strength of fit score to that applicant's fit score, at step 112. However, each applicant device may not receive the adjusted fit score nor their overall rank in each program's list. The applicant device may receive a limited amount of more detailed information regarding their fit with individual programs, at step 113, to enable reconsideration of their application pattern, but to deter gamesmanship, not sufficient detail to allow an applicant to reverse engineer/ calculate an individual program's strength of values assigned to individual characteristics within individual categories (themes).

Figure 10B:
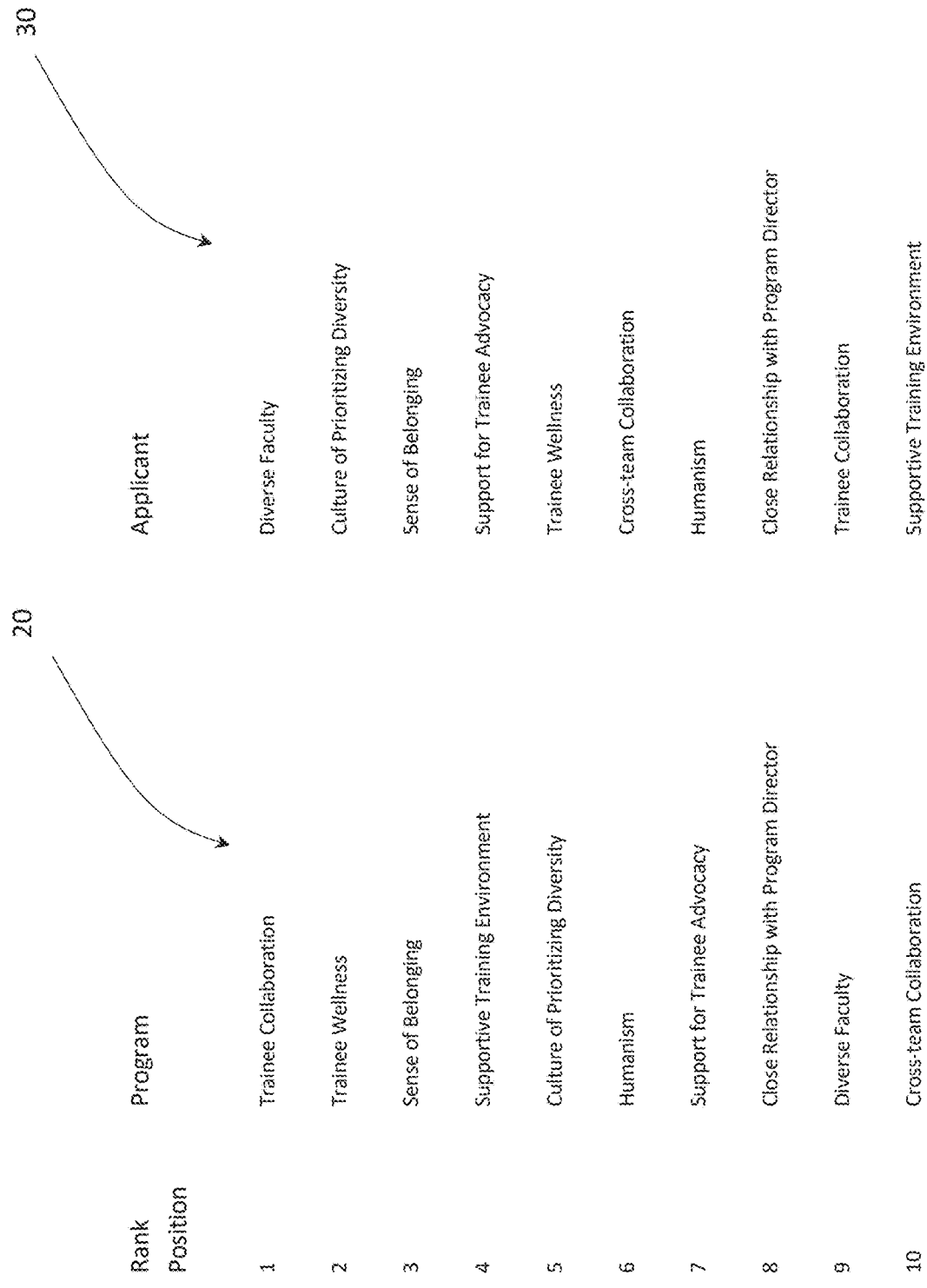
FIG. 10B illustrates a characteristic comparison, using paired comparison analysis without sliding scale, resulting in a fit score of 50 indicating that the applicant and the program rankings have no discernible pattern.
Figure 10C:
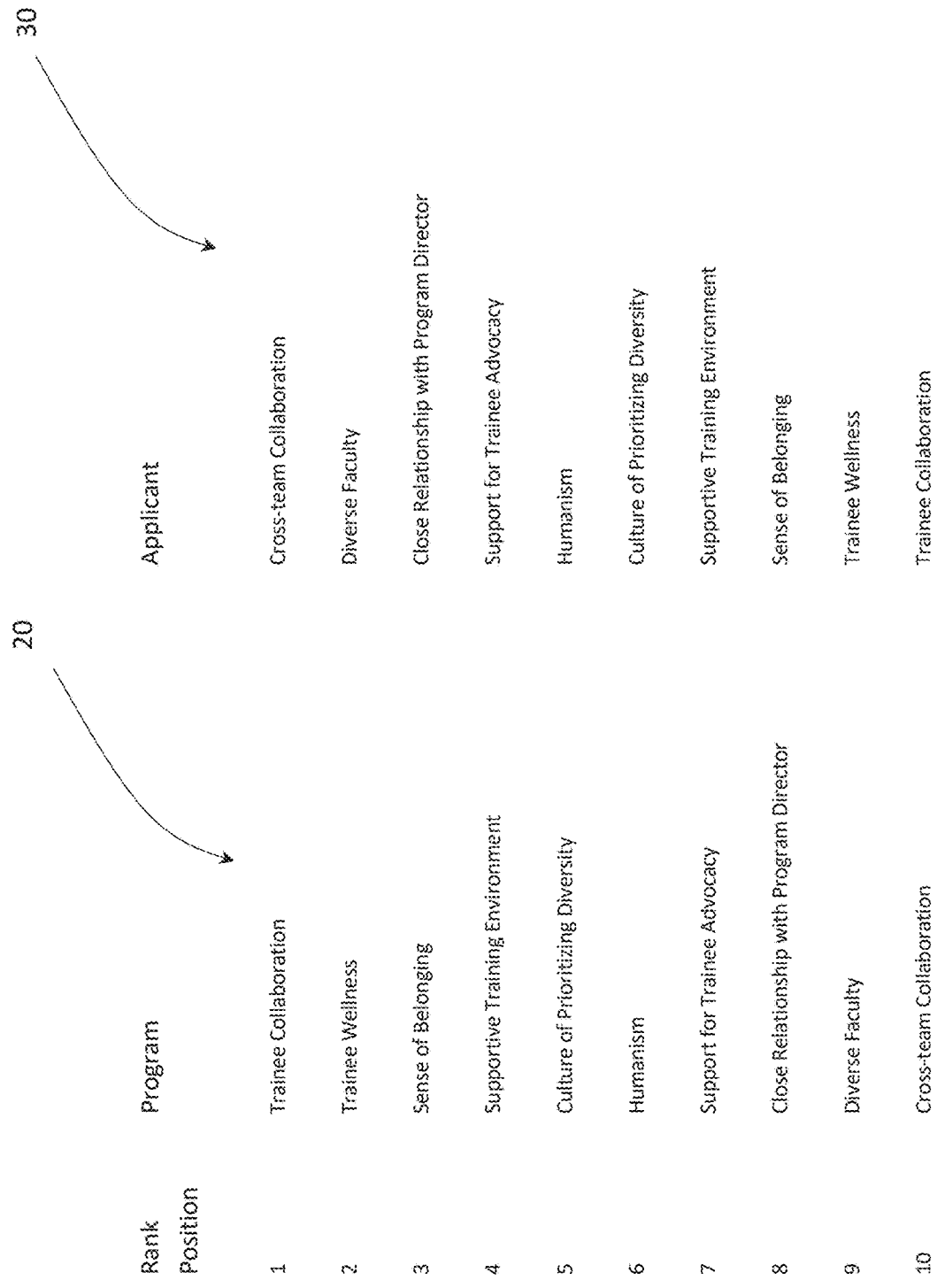
FIG. 10C illustrates a characteristic comparison, using paired comparison analysis without sliding scale, resulting in a fit score of 0 indicating that the applicant has ranked all characteristics in the exact opposite order of the program rating.

The fit scores quantify the strength of the association between the program's overall ranking of each category (theme) of characteristics, and the applicant's ranking of the category (theme) of characteristics. The fit score may range from 0 to 100. With paired comparison analysis without sliding scales, with reference to FIG. 10A, a fit score of 100 indicates that the applicant has ranked all characteristics in the exact same order as the program rating. With reference to FIG. 10B, a fit score of 50 indicates that the applicant and the program rankings have no discernible pattern. With reference to FIG. 10C, a fit score of 0 indicates that the applicant has ranked all characteristics in the exact opposite order of the program rating. With sliding scales, the fit scale may be similarly transformed onto a scale of 0 to 100.

With reference to FIGS. 11A to 11E, there are a number of ways that each program may interpret the fit scores to enable the assessment system 1 to generate a ranked list of applicants. Each program may choose to focus impressionistically on one or two categories they prioritize most as a program by disproportionately weighting one or two of the fit scores over the others resulting in a disproportionately weighted average. For example, with reference to FIG. 11B, some programs, who value culture most, may request or establish a ranked list 60, which prioritizes Applicant A, because of their highest fit score (68), and reject Applicant B, because of their lowest fit score (3), i.e. weigh culture fit score 100% and other fit scores 0%. Meanwhile, with reference to FIG. 11C, some programs who value pedagogy most may request or establish a ranked list 60', which selects Applicant B, because of their highest fit score (97) to receive a spot in their program and rejects Applicant A, because of their lowest fit score (8) i.e. weigh pedagogy fit score 100% and other fit scores 0%. Details of the disproportionately weighted average, e.g. formula for weighing one fit score more than the others, may be entered by the representatives of each program or under direction thereof via the graphic user interface 10 during the initial assessment stage or at any time thereafter.

With reference to FIG. 11D, some programs may request or establish a ranked list 60", to take an average of the three fit scores to derive an overall fit score, and use that average to compare or rank the applicants.

Alternatively, with reference to FIG. 11E, each program may request or establish a ranked list 60", to calculate a weighted average of the three fit scores based on the category or categories they prioritize most as a program, and use that weighted average to compare or rank applicants. In the illustrated example, one of the categories, e.g. culture, is prioritized twice as much as the other categories.

Each fit score may be computed by the assessment system 1 by first calculating the rank correlation between each applicant's ranking of characteristics 30 for each theme, and the corresponding ranking for each program they are applying to, i.e. the program's overall prioritized list of characteristics 20. The rank correlation may be calculated using different rank correlation methods. Example methods include Spearman's rho or Kendall's tau or a combination of both, such as Spearman's rho/Kendall's tau, with values ranging from −1 (perfect negative correlation) to +1 (perfect positive correlation), with 0 signifying no association.

The rank correlation may then be transformed using the following transformation:

$$Fit = 50x + 50$$

to derive the final fit score, where x is the rank correlation. The transformation enables easier interpretation of the fit scores, i.e. the scaling (multiplication) transformation makes the scores larger and easier to interpret, and the shift (addition) transformation ensures all scores are positive, with a minimum of 0 and a maximum of 100.

According to some embodiments, system 1 may use different rank correlation methods for the comparison for the fit scores. This may be referred to as a rank correlation process which can involve using a vector distance or similarity metric (e.g. cosine similarity, Euclidean distance, Manhattan distance, Spearman's rho, Kendall's tau).

The scores from multiple categories of characteristics (scored using paired comparison analyses) can be weighted by the other party's category rankings. These rankings are the results of paired comparison analyses that compare the preference of these multiple categories in contrast to each other.

Additionally, a score comparing two different parties' category rankings can also be calculated by different distance metrics (e.g. Euclidian distance, vector distance). In an example, rankings can be represented as vectors (i.e. where the rankings represent coordinates in a multidimensional vector space).

For the programs, example values of the assessment system 1 includes:
1) Identifying the small number of applicants whose fit/alignment is at the very opposite end of the spectrum to those of the program;
2) For use as an additional data point for the small pool of applicants vying for the final interview spots;
3) For use to prioritize those who highly align with the program's values and mission for interview invitations;
4) For use to prioritize applicants during their ranking by the program, for applicants who are otherwise equal in all other respects.

For the applicants, example values of the assessment system 1 includes: helping in identifying those programs whose values most resonate with their own for the purpose of deciding on relative investment of time, money and other personal resources.

The assessment system 1 may also generate and transmit to one or more selected applicant devices an applicant guidance report, at step 112, which identifies to each of the selected applicants a list of the programs that they did not select or apply for, but that nevertheless ranked relatively high, e.g. over a predetermined threshold, in the applicant to program alignment fit score calculations. Similarly, the assessment system 1 may also generate and transmit to one or more selected program devices a program guidance report, at steps 110 and 111, which identifies general features of applicants, preferably without clear identification, who did not consider that program acceptable despite ranking highly in the applicant to program alignment calculations. The program guidance report may provide insight into general features, e.g. geographic, gender, age, socio-economic, race etc. of applicants, who ranked relatively high, e.g. over a predetermined threshold, in the applicant to program alignment fit score calculations, but did not apply to their program to guide programs for future targeted marketing of their program. The program guidance report may also provide insight into general features, e.g. geographic, gender, age, socio-economic, race etc. of applicants, who did not rank highly in the applicant to program alignment calculations, to guide programs for future changes of their program that may be required.

Embodiments described herein can provide improvements related to how to measure the test reliability and how to calculate correlations. For example, embodiments described herein can involve creation of a cross-category weighted average, cross-category alignment score, and discovery that the process yields favourably small or negligible group differences.

For cross-category weighted average, system 1 takes the individual category correlations between each applicant and a specific program, then weights those values dependent upon that program's relative weighting given in their unique cross-category paired comparison analysis result. The scores from multiple categories of characteristics (e.g. scored using paired comparison analyses) can be weighted by the other party's category rankings. These rankings can be the results of paired comparison analyses that compare the preference of these multiple categories in contrast to each other.

Additionally, for cross-category alignment score, a score comparing two different parties' category rankings can also be calculated by system 1 using different distance measures (e.g. Euclidian distance, vector distance). In this example, rankings can be conceptualized as vectors (i.e. where the rankings represent coordinates in a multidimensional vector space).

The resultant alignment strengths of applicant to program can be found to be largely independent of any group differences such as race, ethnicity, gender, socioeconomic status, and beyond (on average).

Figure 12A:
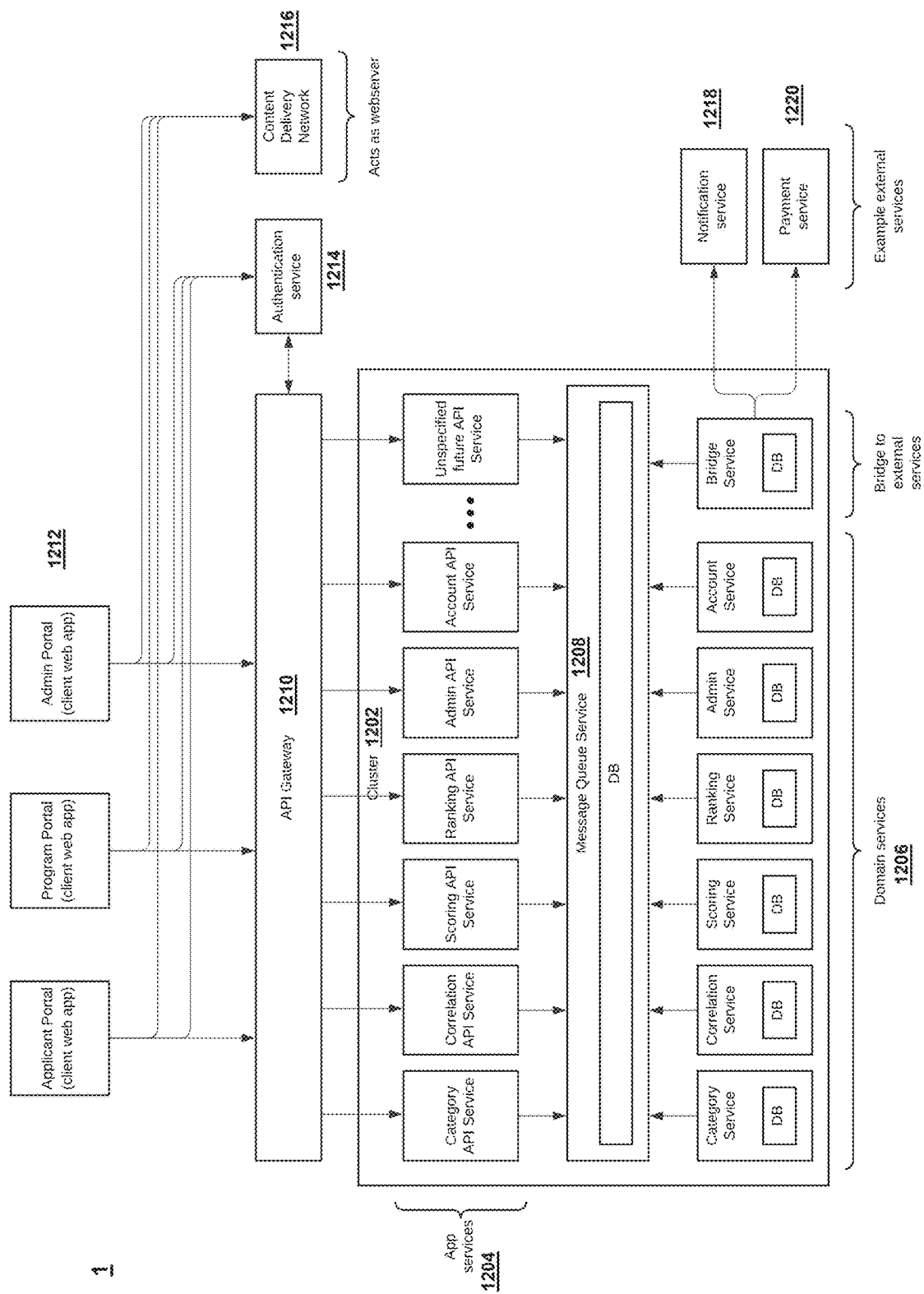
FIG. 12A shows an example assessment system according to embodiments described herein.

FIG. 12A shows another example assessment system 1 according to embodiments described herein. Assessment system 1 provides a modular online platform of multiple services.

Assessment system 1 has a cluster 1202 of application services 1204 and domain services 1206 in communication via a message queue service 1208. System 100 can have an API gateway 1210 for communication between different client web applications 1212 and the application services

1204. Assessment system 1 can also have an authentication service 1214 to authenticate users' client web applications 1212 and their respective electronic devices. Assessment system 1 also has a content delivery service 1216 to deliver test content to client web applications 1212 and electronic devices.

Client web applications 112 include different types of interfaces or portals for different users. Client web applications 112 provide an interface layer to provide front-end user interfaces. Client web applications 112 interact with the different application services 104 via API gateway 102 to exchange data and commands. For example, client web applications 112 can include: applicant portal, administrator portal, and program portal.

Applicant portal is for use by each of a plurality of applicants. Accordingly, applicant portal may manage multiple instances for each of the applicants. Applicant portal has a graphic user interface (GUI) configured to enable a respective applicant to enter a respective first prioritized list of characteristics in a (first) category relating to one or more positions offered by each of a plurality of programs into which the applicant wishes to apply.

Program portal is for use by one or more representatives of each of the plurality of programs. Program portal has a GUI configured to enable a respective representative of one or more programs to enter a second prioritized list of the characteristics in the (first) category.

Administrator portal is for use by administers of the assessment system 1 to configure aspects of programs and assessments. Administrator portal can also provide reports of data generated by assessment system 1 related to applicants, programs, fit score, ranked lists, and so on.

Assessment system 1 has domain services 1206 that implement functions for online assessments for applicants/programs, and the application services 1204 receives commands from client web applications 1212 and exchange data in response to requests. Message queue service 1208 coordinates messages between application services 1204 and domain services 1206. Message queue 1208 ensures delivery of messages to the relevant service even if offline.

Application services 1204 can include a number of different service APIs. Example API services include: category API service, correlation API service, scoring API service, ranking API service, administration API service, account API service. There can be additional application services 1204 added to the cluster 1202 to provide different functionality for assessment system 1.

Domain services 1206 can include a number of different services corresponding to application services 1204. Example domain services 106 include: category service, correlation service, scoring service, ranking service, administration service, account service. There can be additional services added to the cluster 1202 to provide different functionality for assessment system 1.

Category service can manage commands and data for categories and characteristics. A set of characteristics can be linked to a category relating to one or more positions offered by each of a plurality of programs. There can be multiple categories relating to programs. Category service can scale based on number of users. As noted, applicant portal can provide a first prioritized list of characteristics in a first category relating to one or more positions offered by each of a plurality of programs into a respective applicant wishes to apply. Program portal can provide, for each program, another second prioritized list of the first plurality of characteristics in the first category. Category service can provide category/characteristic data to category API service to populate the GUIs of the web applications 1212 (e.g. applicant portal and program portal) in order to receive the prioritized lists of characteristics for different categories. Category API service can receive the category/characteristic data from the web applications 1212 (e.g. applicant portal and program portal) and provide the data to category service.

Correlation service can determine a first ranked correlation between each first prioritized list and each second prioritized list. Scoring service can generate a corresponding first fit score for each of the plurality of applicants for each of the plurality of programs based on the first ranked correlations. Scoring service then sends the corresponding first fit score to scoring API service (via message queue service 1208) which then transmits the fit score data to applicant portal(s) for each of the plurality of applicants for each of the plurality of programs that they applied to. Ranking service generates a corresponding ranked list of the applicants that applied thereto, based on the corresponding first fit scores. Ranking service then sends the corresponding ranked list of the applicants to ranking API service (via message queue service 1208) which then transmits the ranked list(s) of the applicants data to program portal(s).

Category service can create a list of the categories and a list of the characteristics for each category that both applicants and the programs most value, based on what one or more representatives of the program and/or one or more sample applicants consider to be the priorities and values. A structured method of communication may be implemented by category service. Category service can use one or more surveys to capture category data and characteristics. Category service can create a final set of categorized characteristics may be produced for different environments being addressed. For example, category service can generate a set of 2-5 categories with each category having 5-8 characteristics. These are example ranges. Category service links each category with a set of characteristics. A set of categories can be linked to programs and/or applicants.

By enabling selection of the categories (or themes) and the characteristics each program most values and offers, category service may create a prioritized list of characteristics based on what each program consider to be the priorities and values of the corresponding program in its current state. The prioritized lists of characteristics, based on perceptions of the program's representatives, may be used to calculate the average or overall final prioritized list of characteristics for the program's priorities and values.

The final prioritized list of characteristics for each program may then be compared to each of the applicant's corresponding prioritized lists. The comparison can determine how closely the values and program offerings align to those of all the applicants' values and preferences across a plurality of themes or categories, e.g. work environment, training methods, pedagogy, and culture.

The assessment system 1 compares a total plurality of characteristics when summing across all categories or across a plurality of categories or themes, with each category having a plurality of characteristics within that category. The scoring service generates a plurality of separate assessment or "fit" scores measuring the alignment between each program and each of the applicants, i.e. one fit score for each theme for each program.

After the categories (themes) and characteristics have been determined (or received as input), each program portal may each provide assessment input data for different programs. For example, there may be at least 5 programs, or more than 10 programs. Each program can have spots or positions to fill with applicants. Each applicant may only be applying for positions at selected programs, i.e. may not be applying for positions at all of the programs.

There may be a single category (theme) or a plurality of categories (themes) of comparisons, depending on the type of programs and positions. For each category, input data for the plurality of related characteristics may rank the characteristics in order of priority.

Administrator service and administrator API service exchange data and commands relating to administrator portal to configure aspects of programs and assessments, and generate reports related to applicants, programs, fit score, ranked lists, and so on. Account service and account API service exchange data and commands relating to accounts for applicants and programs. Data specific to an applicant can be managed and stored in relation to the applicant's account. For example, an applicants input data for the prioritized list of characteristics for different categories can be stored in relation to the applicant's account, along with corresponding fit score, and so on. Authentication service 1214 can work with account services to manage usernames, passwords, and other account authentication data.

Content delivery network 1216 allows for content creation and management. The content services delivers content for different interfaces and GUIs of assessment system 1.

Message queue service 108 coordinates communication between application services 104 and domain services 106. Instead of having the application services 104 and domain services 106 communicate directly to each other, each of the application services 104 and domain services 106 communications with the message queue 108 which coordinates messaging between the application services 104 and domain services 106. This enables the application services 104 and domain services 106 to perform functions without having to understand the details (e.g. protocols, configurations, commands) of all the other services. Additional application services 104 and domain services 106 can be added on as new services to plug into the message queue 108.

System 1 has a bridge service 122 to connect to different external services. For example, system 1 can use bridge service 122 to connect with notification service 1218 to provide different messages and alert functions as described herein. System 1 can also connect to a payment service 1220 for payments in relation to programs and applications, and to capture data and exchange commands. In other embodiments, notification service 1218 and payment service 1220 can be internal domain services 106.

System 1 provides computing apparatus for providing a program assessment with a first processor; and a first memory storing instructions that, when executed by the processor, configure the computing apparatus to implement operations for computing first fit scores for each of the one or more applicant portals for each of the plurality of programs that they applied to, and ranked lists of the applicants to each of the one or more program portals.

The one or more applicant portals have a corresponding one or more first GUIs configured to receive a respective first prioritized list of a first plurality of characteristics in a first category relating to one or more positions offered by each of a plurality of programs into which the plurality of applicants wish to apply. The one or more applicant portals can be at a corresponding one or more applicant devices having one or more input devices configured to collect the first prioritized list data and having a transmitter for transmitting the first prioritized list data.

The one or more program portals have a corresponding one or more second GUIs to receive a second prioritized list of the first plurality of characteristics in the first category. The one or more program portals at a corresponding one or more program devices having one or more input devices configured to collect the second prioritized list data and having a transmitter for transmitting the second prioritized list data.

The cluster 1212 can be implemented using one or more machines with the application services 1204 and domain services 1206 to determine a first ranked correlation between each first prioritized list and each second prioritized list, generate a corresponding first fit score for each of the plurality of applicants for each of the plurality of programs based on the first ranked correlations, and generate for each of the plurality of programs, a corresponding ranked list of the applicants that applied thereto based on the corresponding first fit scores.

The cluster 1202 uses the API gateway 1210 to send the corresponding first fit score to each of the one or more applicant portals for each of the plurality of programs that they applied to. The cluster 1202 uses the API gateway 1210 to send the corresponding ranked list of the applicants to each of the one or more program portals.

Accordingly, assessment system 1 has a plurality of client web applications 1212 such as one or more applicant portals and one or more program portals. Assessment system 1 has a plurality of application services 1204 such as a category application programming interface service, a correlation application programming interface service, a scoring application programming interface service, a ranking application programming interface service, an administrator application programming interface service, and account application programming interface service. Assessment system 1 has an (application programming interface) API gateway 1210 to transmit messages and exchange data between the plurality of client web applications 1212 and the plurality of application services 1204. Assessment system 1 has at least one memory and at least one hardware processor coupled to the memory programmed with executable instructions. The instructions configuring the processor with a plurality of domain services 1206 such as a category service, a correlation service, a scoring service, a ranking service, an administrator service, and account service. Assessment system 1 has a message queue service 1208 for coordinating messages between the plurality of application services 1204 and the plurality of domain services 1206.

Assessment system 1 provides the applicant portal configured with one or more first GUIs configured to receive a respective first prioritized list of a first plurality of characteristics in a first category relating to one or more positions offered by each of a plurality of programs into which the plurality of applicants wish to apply. The program portal is configured with one or more second graphic user interfaces configured to receive a second prioritized list of the first plurality of characteristics in the first category. The category service and the category application programming interface service generate the first plurality of characteristics in the first category. The correlation service and the correlation application programming interface service determine a first ranked correlation between each first prioritized list and each second prioritized list. The scoring service and the scoring application programming interface service generate a corresponding first fit score for each of the plurality of applicants for each of the plurality of programs based on the first ranked correlations. The ranking service and the ranking application programming interface service generate a corresponding ranked list of the applicants that applied thereto, based on the corresponding first fit scores. A notification service transmits the corresponding first fit score to the applicant portal for each of the plurality of programs that they applied to, and transmits the corresponding ranked list of the applicants to the program portal.

In some embodiments, assessment system 1 has an authentication service. The applicant portal authenticates the applicant using the authentication service prior to receiving input data.

In some embodiments, the one or more graphic user interfaces of the applicant portal(s) are configured to enable each of the plurality of applicants to enter a prioritized list of another set of a plurality of characteristics in another category relating to the one or more positions offered by each of the plurality of programs into which the plurality of applicants wish to apply. In some embodiments, the one or more graphic user interfaces of the program portal are configured to enable the one or more representatives of each of the plurality of programs to enter another prioritized list of the other set of plurality of characteristics in the other category. Assessment system 1 determines, by the processor, another ranked correlation between each prioritized list, and generates a corresponding other fit score for each of the plurality of applicants for each of the plurality of programs based on the other ranked correlations. Assessment system 1 generates, by the processor, for each of the plurality of programs, the corresponding ranked list of the applicants based on the corresponding first fit scores and the corresponding second fit scores; and sends the corresponding second fit score to each of the plurality of applicant portals.

In some embodiments, the applicant portal presents to each applicant a first series of forced choice comparisons including pairs of the first plurality of characteristics to choose from. Assessment system 1 uses the processor to determine the first ranked correlations based on results of the first series of forced choice comparisons.

In some embodiments, the applicant portal presents to each applicant the first series of forced choice comparisons including the pairs of the first plurality of characteristics with a sliding scale to choose from. In some embodiments, the program portal presents to each representative a second series of forced choice comparisons including the pairs of the first plurality of characteristics to choose from. Assessment system 1 determines the first ranked correlations based on results of the second series of forced choice comparisons.

In some embodiments, the one or more graphic user interfaces of the applicant portal(s) are configured to enable each of the plurality of applicants to enter a fifth prioritized list of a third plurality of characteristics in a third category relating to the one or more positions offered by each of the plurality of programs into which the plurality of applicants wish to apply. In some embodiments, the one or more graphic user interfaces of the program portal are configured to enable the one or more representatives of each of the plurality of programs to enter a sixth prioritized list of the third plurality of characteristics in the third category. Assessment system 1 determines, by the processor, another ranked correlation between each prioritized list, and generates a corresponding other fit score for each of the plurality of applicants for each of the plurality of programs based on the other ranked correlations. Assessment system 1 generates, by the processor, for each of the plurality of programs, the corresponding ranked list of the applicants based on the corresponding first fit scores, the corresponding other fit scores. Assessment system 1 sends the corresponding third fit score to each of the plurality of applicants.

In some embodiments, assessment system 1 generates, by the processor, for a selected one of the plurality of programs, a guidance report including general features of applicants that did not apply to the selected program, but generated corresponding first fit scores over a predetermined threshold, and sends the guidance report to the selected one of the plurality of program portals.

In some embodiments, assessment system 1 generates, by the processor, for a selected applicant of the plurality of applicants, a guidance list of the plurality of programs that the selected applicant did not apply to, but generated corresponding first fit scores over a predetermined threshold, and sends the guidance list to the selected one of the plurality of applicant portals.

Figure 12B:
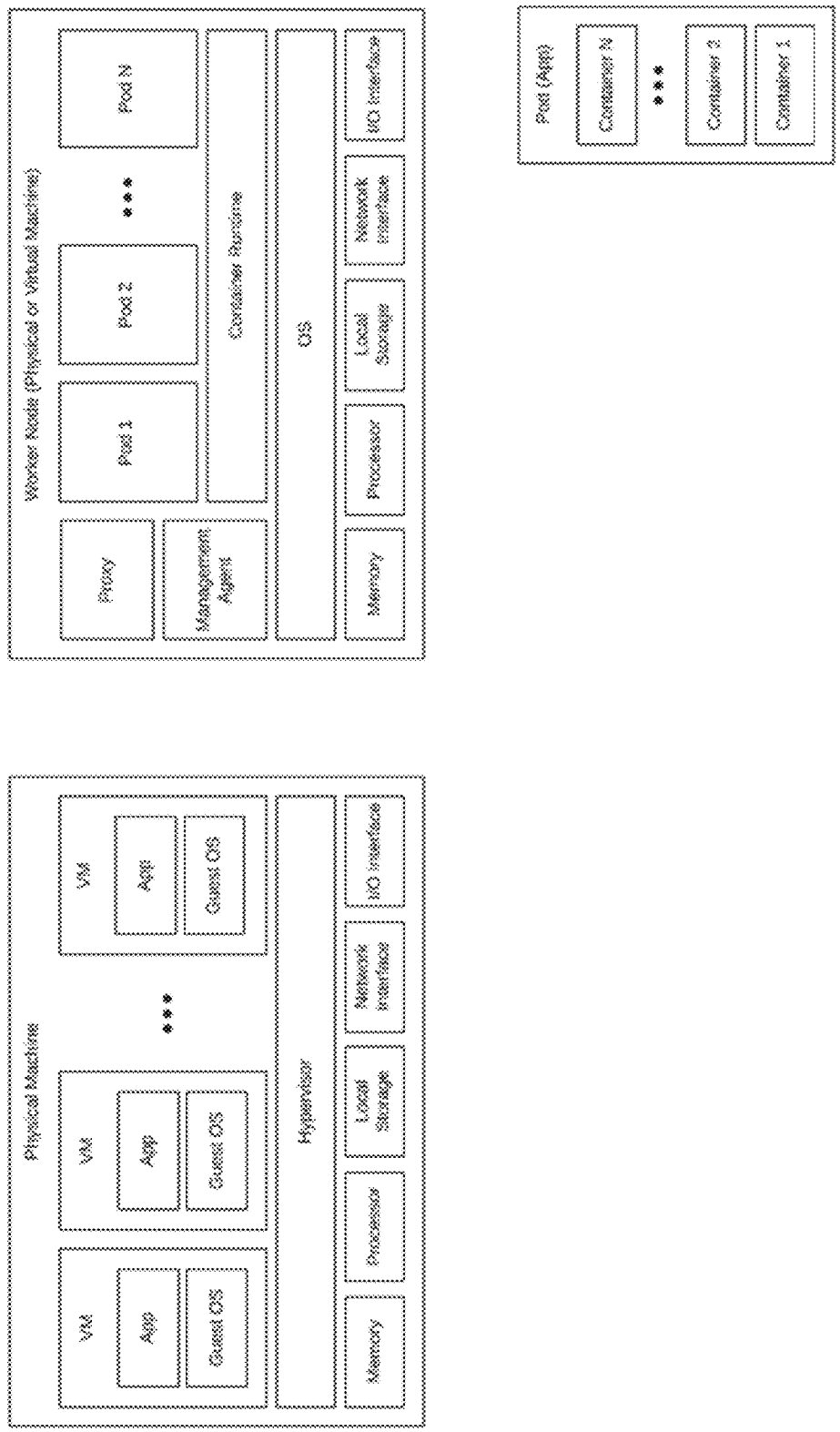
FIG. 12B shows an example schematic diagram of worker nodes for a system for secure assessments.

FIG. 12B shows an example schematic diagram of worker nodes for an assessment system 1.

Assessment system 1 (or components thereof) can be implemented by one or more physical machines and one or more worker nodes. Physical machine can have at least one processor, memory, local storage device, network interface, and I/O interface.

Each processor may be, for example, any type of microprocessor or microcontroller, or a combination thereof. Memory may include a suitable combination of any type of computer memory that is located either internally or externally. Each I/O interface enables physical machine to interconnect with one or more input devices, such as a keyboard, mouse, camera, touch screen and a microphone, or with one or more output devices such as a display screen and a speaker. Each network interface enables physical machine to communicate with other components, to exchange data with other components, to access and connect to network resources, to serve applications, and perform other computing applications by connecting to a network (or multiple networks) capable of carrying data including any combination of different networks. Physical machines is operable to register and authenticate users (using a login, unique identifier, and password for example) prior to providing access to applications, a local network, network resources, other networks and network security devices. Physical machine may serve one user or multiple users.

Physical machine has virtual machines with applications and guest operating systems. Worker node can be a physical or virtual machine. For example, worker node can be running in a cloud system or on one or more physical machines. Worker node provides the core set of compute resources to run different applications for online testing, such as the application services and the domain services. Worker node has a number of Pods (Pod1, Pod2, . . . . PodN). Pod is like an application or collection of containers (e.g. code) designed to run on the same machine. The number of worker nodes scale depending on the service demands.

In some embodiments, the application services 1204 and domain services 1206 are implemented by at least one physical machine and at least one worker node. The physical machine provides a plurality of virtual machines corresponding to the plurality of application services, the worker node providing core compute resources and serve functions for the application services and the domain services.

Figure 12C:
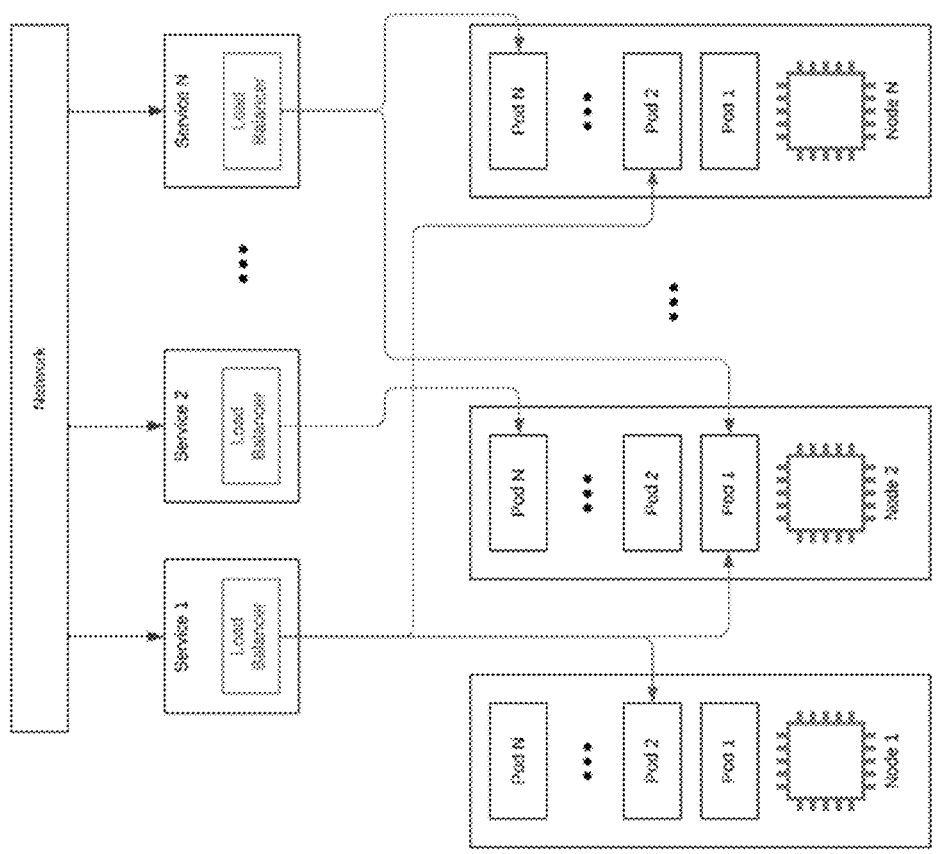
FIG. 12C shows an example schematic diagram of services for a system for secure assessments.

FIG. 12C shows an example schematic diagram of services for an assessment system 1.

Network connects to services which in turn connected to different nodes and sets of Pods. A service is built on Pods that are running on multiple nodes. This provides fault tolerance because there are multiple instances of the online testing application running on different nodes 304 with pods. Services route to different pods and nodes. This provides a flexible and scalable system of hardware components with auto-scaling clusters.

Figure 12D:
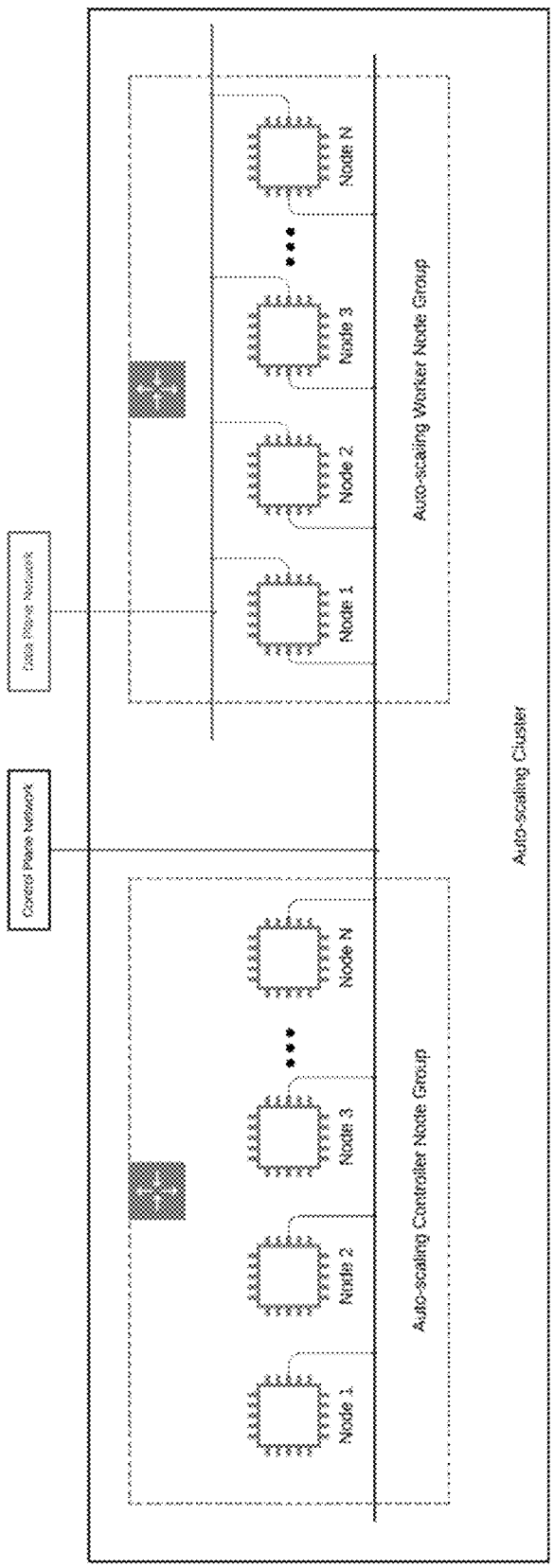
FIG. 12D shows an example schematic diagram of an auto-scaling cluster for a system for secure assessments.

FIG. 12D shows an example schematic diagram of an auto-scaling cluster for an assessment system 1.

Auto-scaling cluster manages the scaling of components of the system 1. Auto-scaling cluster has two parts: control plane network and data plane network. Auto-scaling cluster has auto-scaling controller node groups of multiple nodes (Node 1, Node 2, Node 3, . . . Node N) and auto-scaling worker node groups of multiple nodes (Node 1, Node 2, Node 3, . . . Node N). Controllers add nodes dynamically as additional capacity is needed. Control plane network is a set of services running on nodes that communicate with worker nodes (that are working to serve the application functions). Data plane network is where the main applications communicate and where the main functions are implemented.

In some embodiments, the system 1 has an auto-scaling cluster with a control plane network for an auto-scaling controller node group and a data plane network for an auto-scaling worker node group. The control plane network being a set of services running on nodes that communicate with worker nodes of the auto-scaling worker node group, the data plane network providing communication between the services and implementing functionality of the services, wherein the auto-scaling cluster scales nodes of the groups in response to requests by the application services and the domain services. The worker nodes of the worker node group provide core compute resources and serve functions of the services.

Figure 12E:
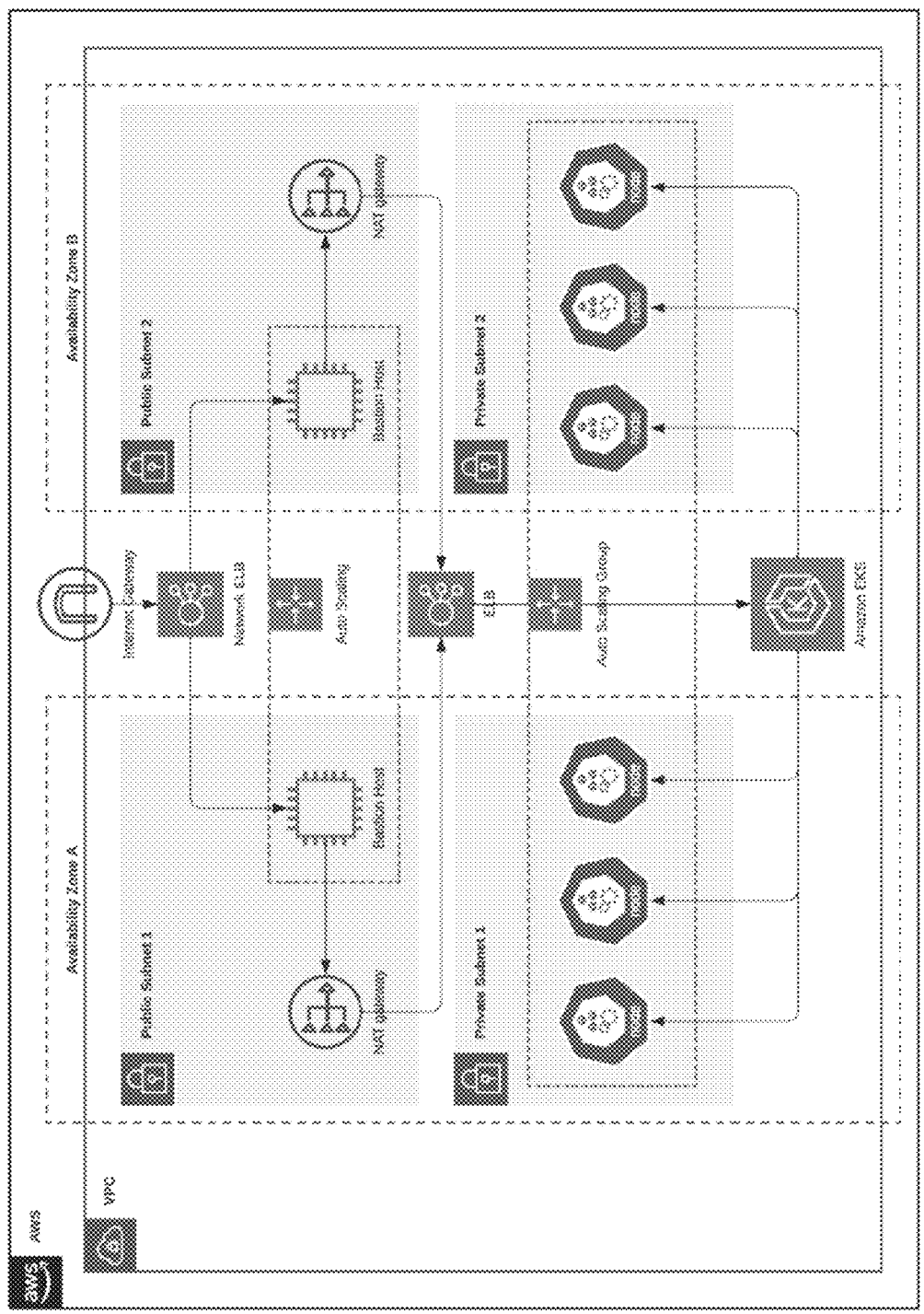
FIG. 12E shows an example schematic diagram of a production cluster for a system for secure assessments.

FIG. 12E shows an example schematic diagram of a production cluster for an assessment system 1.

Production cluster has a plurality of availability zones (e.g. availability zone A and availability zone B) that are physically different data centres on different hardware infrastructure to provide redundancy. If there is a fault with one zone then the availability zones are mirrored so the system 1 can continue running on the other zone.

Production cluster has public subnets (Public Subnet 1, Public Subnet 2 . . . ) and private subnets (Private Subnet 1, Private Subnet 2 . . . ). Public subnet can be considered a DMZ which is a gateway from a public network into the system 1. All traffic comes into system 1 via gateway and an elastic load balancer (ELB) to balance load across system resources by splitting the traffic to spread out traffic over a large number of recipients. Public subnet has Bastion Host (e.g. server, VM, container) that runs NAT gateway to forward traffic into private subnet. Bastion Hosts of public subnets can scale automatically using auto-scaling. Controller scales the Bastion Hosts in response to traffic demand. There is a layer of security for private subnets as there is no way to access the nodes within the private subnet except via the secure gateways. Private subnet has multiple nodes that can scale automatically using auto-scaling group. Controller determines resources needed and auto scales the nodes as needed.

Figure 13:
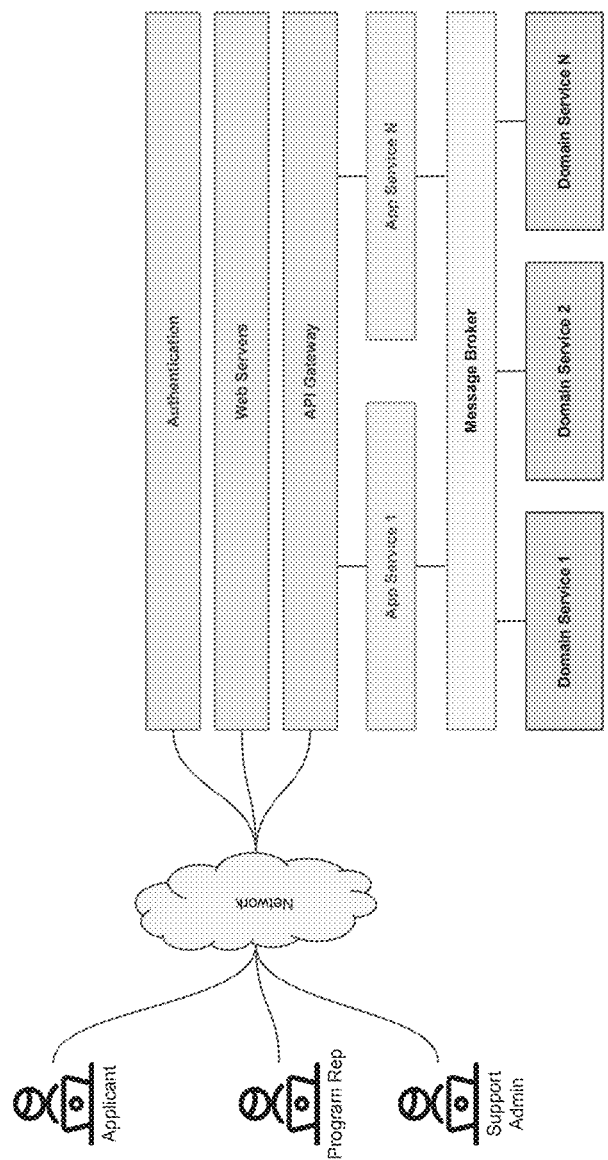
FIG. 13 shows another example assessment system according to embodiments described herein.

FIG. 13 shows another example assessment system 1 according to embodiments described herein. Assessment system 1 connects to different electronic devices (e.g. applicant device, program representative device, administrator device). Assessment system 1 can have authentication service, web servers, and an API gateway that connects to different applications services. A message broker can coordinate messaging between application services and domain services.

Figure 14:
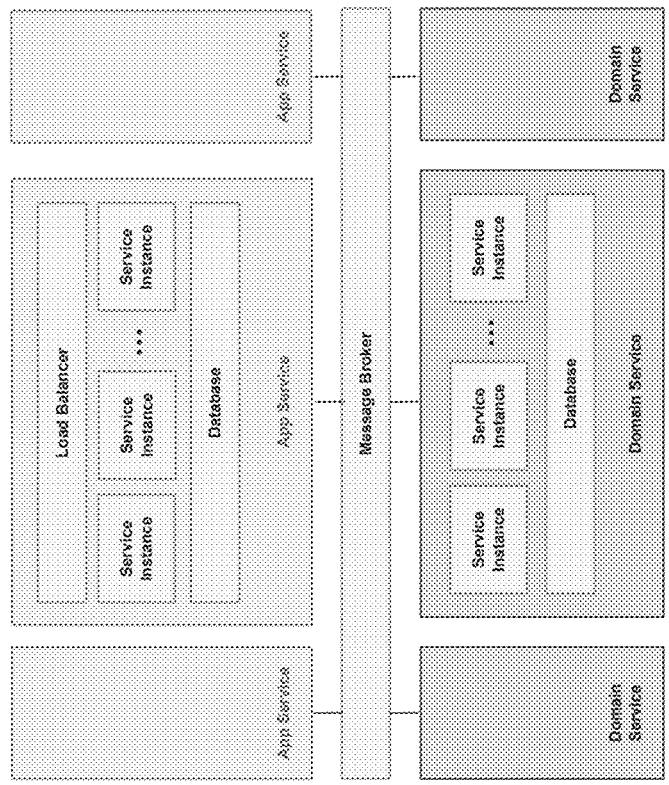
FIG. 14 shows another view of horizontal scalability for an assessment system according to embodiments described herein.

FIG. 14 shows another view of horizontal scalability for an assessment system 1 according to embodiments described herein. The example diagram illustrates horizontal scalability of an example assessment system 1 with multiple machines for application services and domain services. The number of machines can be scaled based on traffic and demand. A machine for an application service can include a load balancer, multiple service instances, and a database. There can be multiple machines for application services. A machine for a domain service can include a load balancer, multiple service instances, and a database. A message broker can coordinate messaging between machines of application services and machines of domain services.

Figure 15:
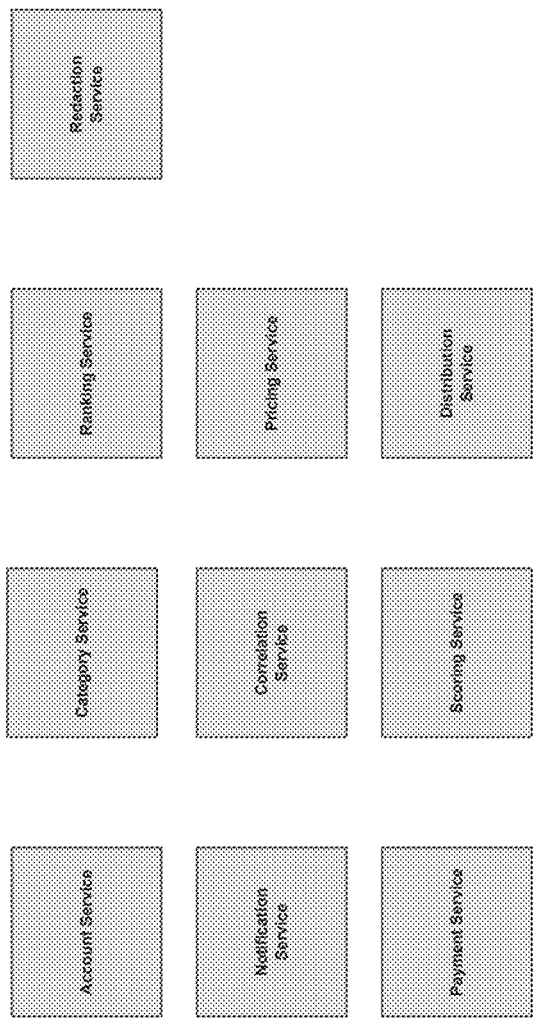
FIG. 15 shows example domain services.

FIG. 15 shows example domain services including: account service, notification service, payment service, category service, correlation service, scoring service, ranking service, pricing service, distribution service, redaction service, and so on.

Figure 16:
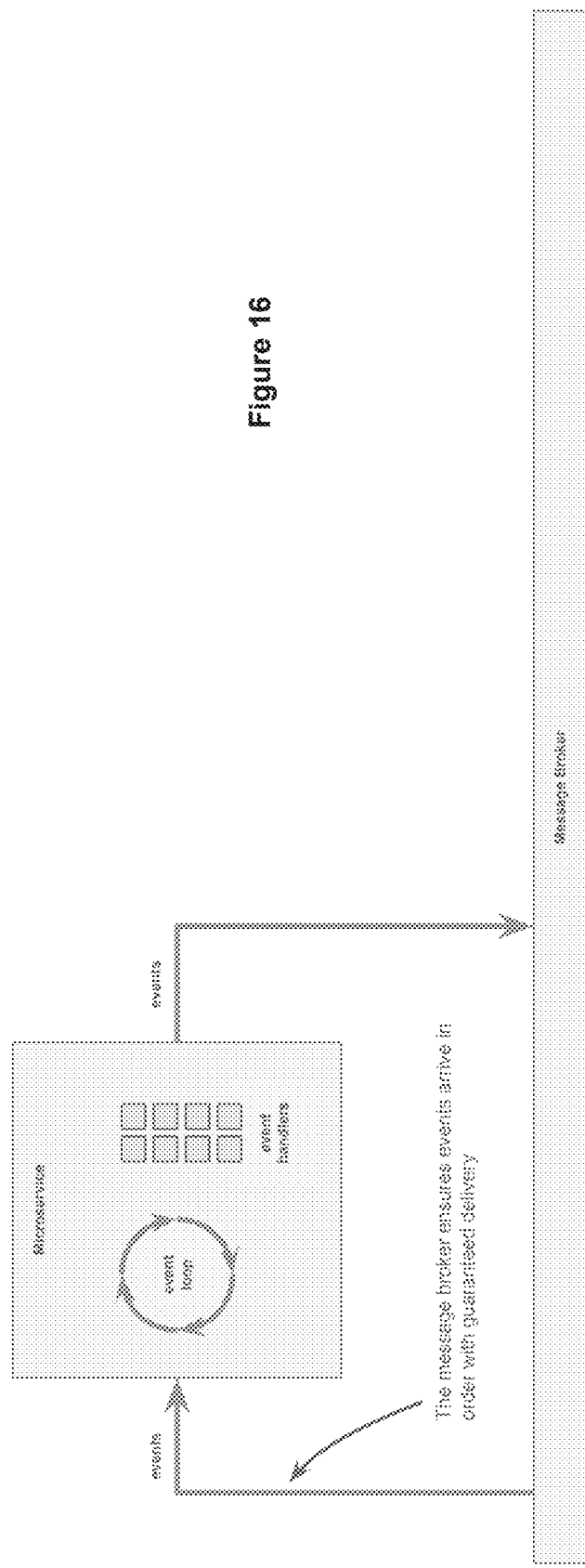
FIG. 16 shows an example stateless service.
Figure 17:
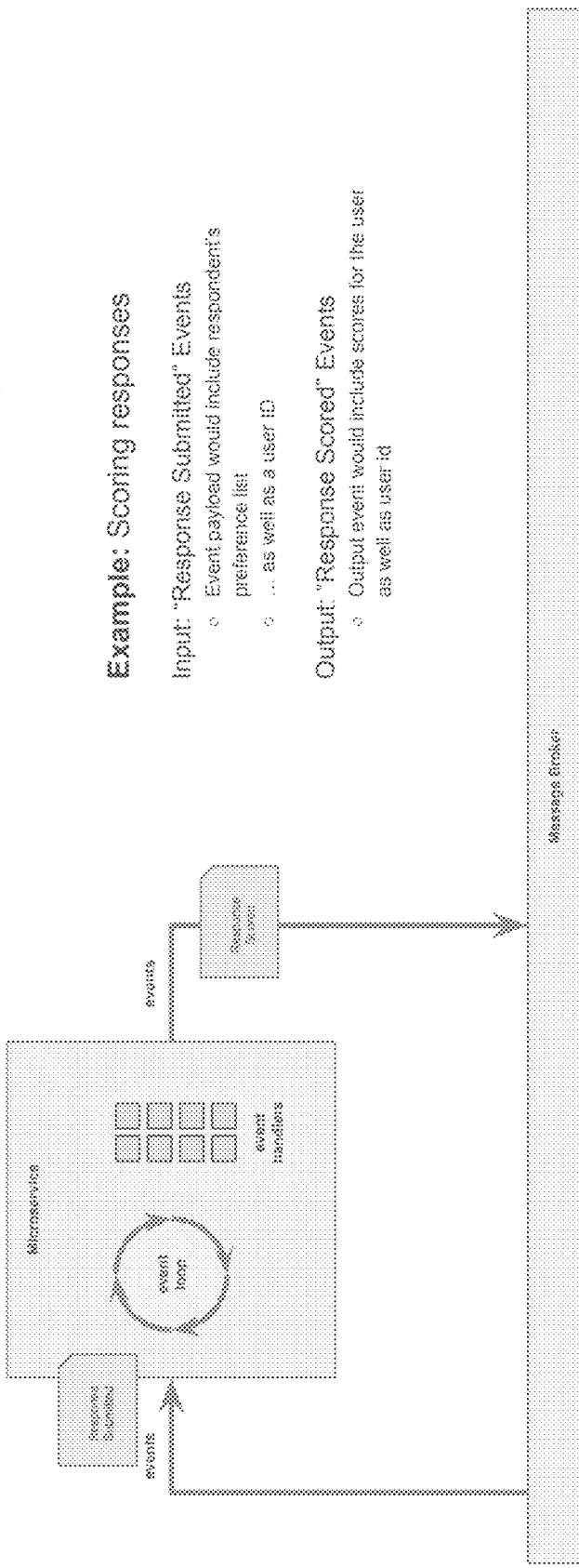
FIG. 17 shows another example stateless service.
Figure 18:
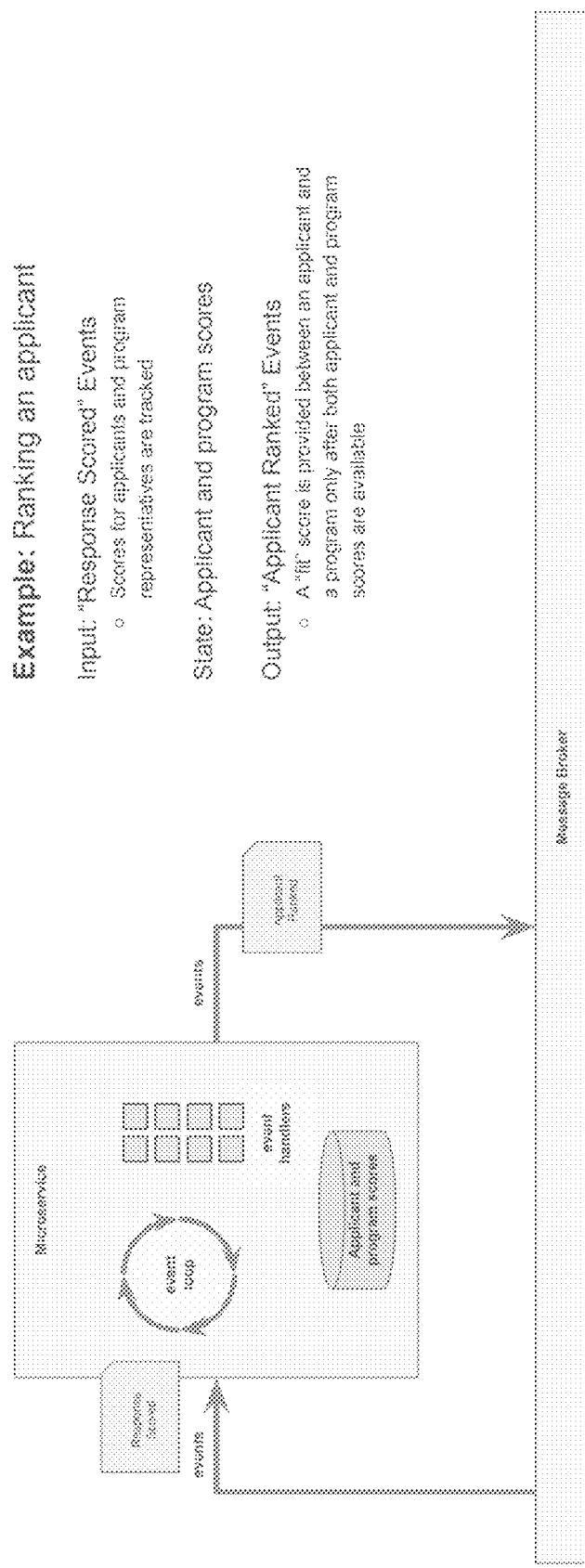
FIG. 18 shows an example stateful service.

System 100 can have stateless services and stateful services. FIGS. 16 and 17 show an example stateless service. FIG. 18 shows an example stateful service. A stateful service processes requests based on its current state, and stores states internally. For example, account service needs to keep track of user profiles, user permission, and so on. However, an account service can also store states in an external database so that a stateful service can become a stateless service by externally storing state information. A stateless service processes requests without considering states. All requests are processed independently and the stateless service does not maintain an internal state. An advantage of stateless services is that they are easier to scale because you do not have to manage states.

As shown in FIG. 16, the message broker ensures events arrive at microservice in order with guaranteed deliver. The microservice has an event loop and an event handler to process and generate events. The microservice sends events to the message broker. FIG. 17 shows an example stateless service for scoring responses from GUIs in relation to characteristics/categories or programs. Input data can include 'response submitted' events and the event payload can include respondents preference list. Output data can include 'response scored' events and the output event payload can include scores for the user as well as user identifiers. The microservice can receive 'response submitted' events from the message broker. The microservice can provide 'response scored' events to the message broker. FIG. 18 shows an example stateful service for ranking an applicant. Input data can include 'response scored' events and the event payload can include scores for applicant and program representative. The state of the mircoservice can be applicant and program scores. Output data can include 'applicant ranked' events and the output event payload can include fit scores between applicants and programs only after both applicant and program scores are available. The microservice can receive 'response scored events from the message broker. The microservice can provide 'applicant ranked' events to the message broker.

Figure 19:
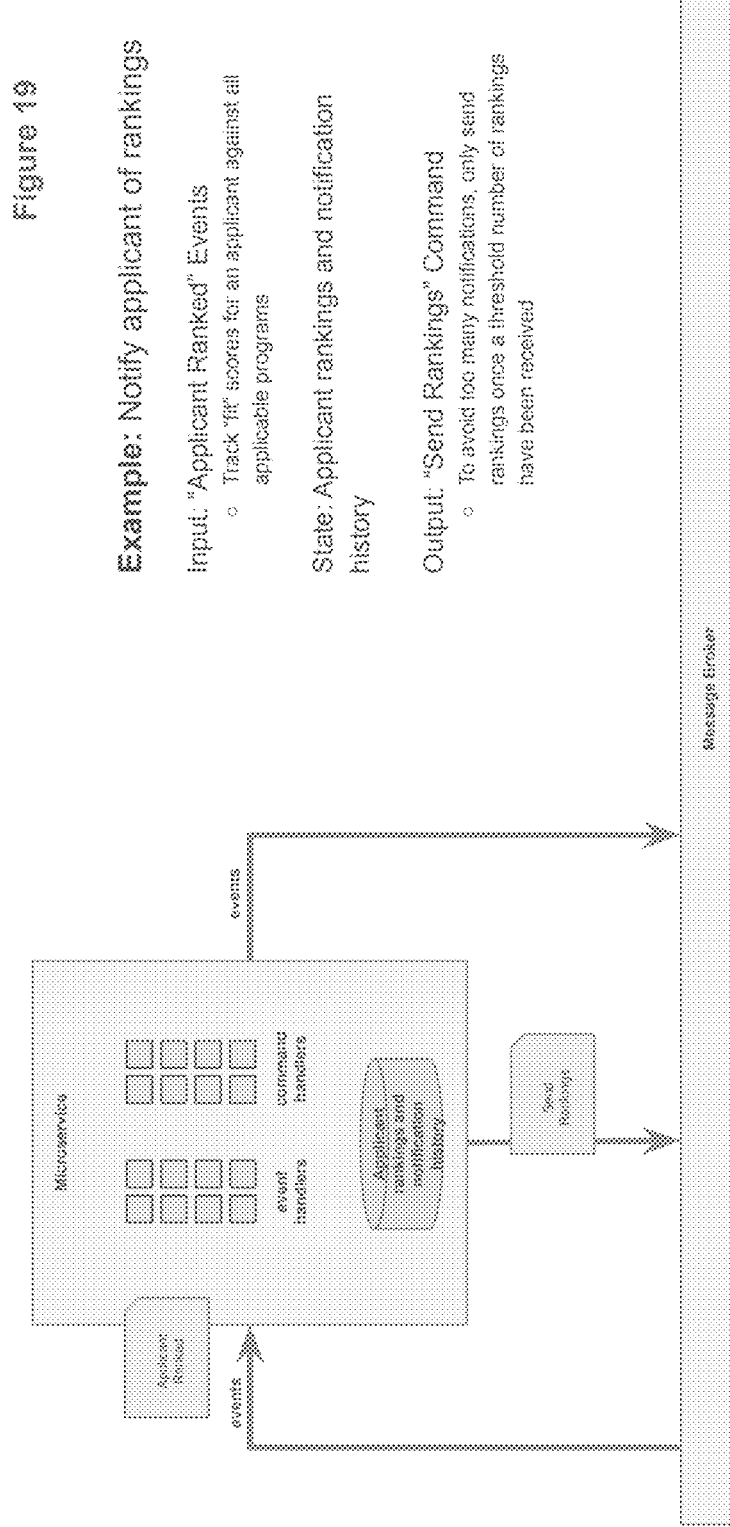
FIG. 19 shows an example service for generating commands.

FIG. 19 shows an example service for generating commands. In this example, the microservice is a stateful service for notifying applicant of rankings. Input data can include 'applicant ranked' events and the event payload can be used to track fit scores for an applicant against all applicable programs. A memory can store the state of the mircoservice which can be data for applicant rankings and notification history. Output data can include 'send rankings' commands. To avoid too many notifications, the command can have code to only send rankings once a threshold number of rankings have been received. The microservice can receive 'applicant ranked' events from the message broker. The microservice can provide 'send rankings' commands to the message broker.

Figure 20:
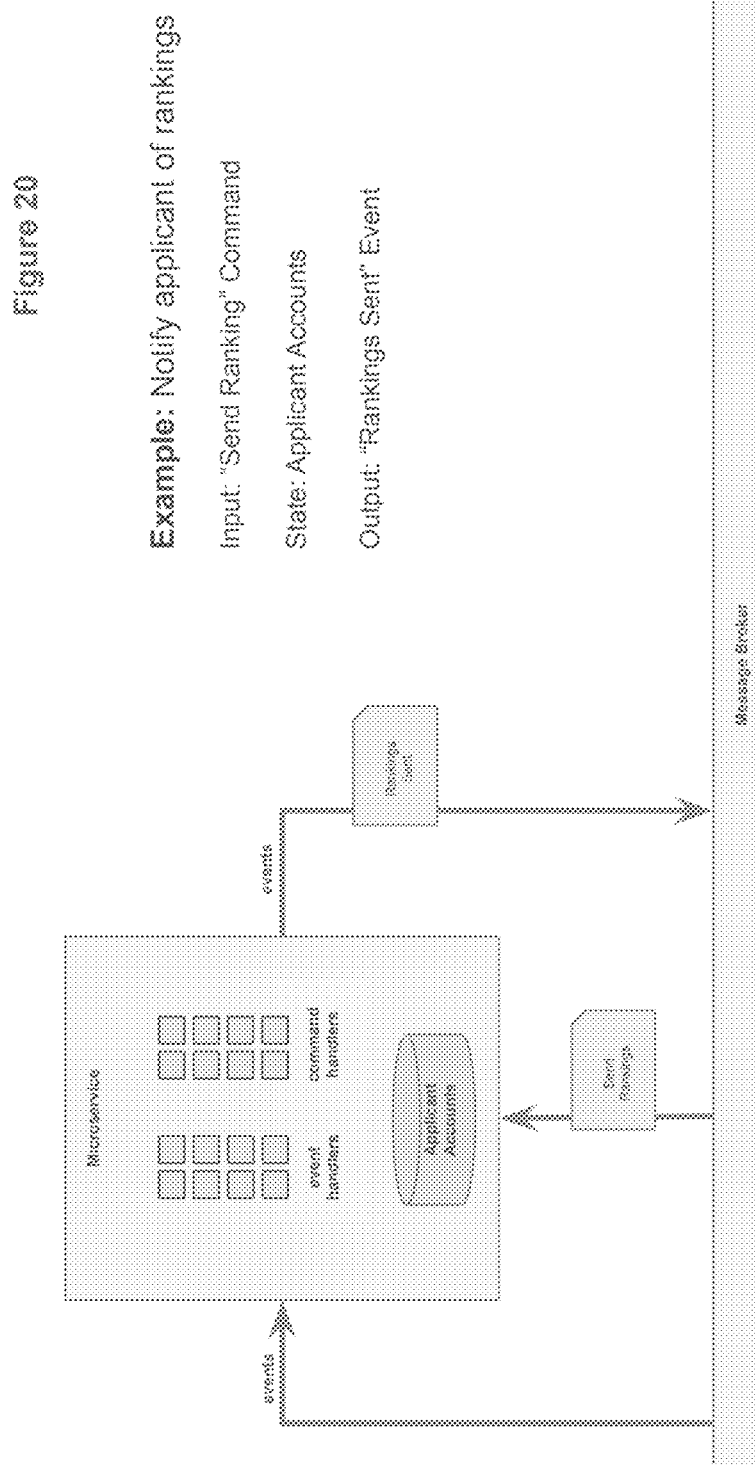
FIG. 20 shows an example service for processing commands.

FIG. 20 shows an example service for processing commands. In this example, the microservice is a stateful service for applicant accounts. Input data can include 'send ranking' commands. A memory can store the state of the mircoservice which can be data for applicant accounts. Output data can include 'rankings sent' events. The microservice can receive 'send ranking' commands from the message broker. The microservice can provide 'rankings sent' events to the message broker.

Figure 21:
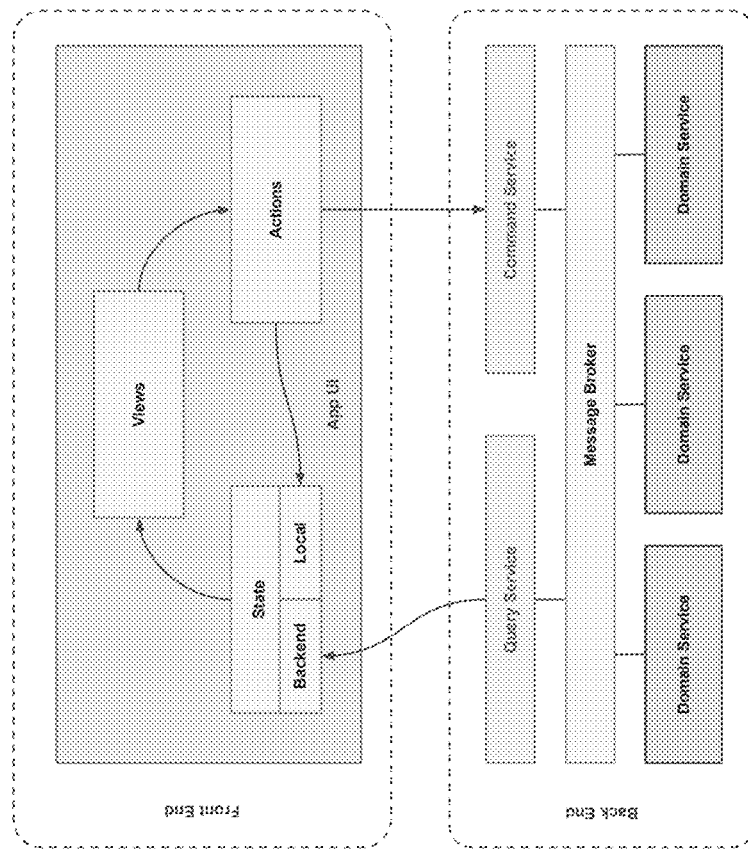
FIG. 21 shows an example command and query flow.

FIG. 21 shows an example command and query flow. The diagram shows front end components and back end components. The front end components include an application user interface with actions, views, and state memory (with backend and local states). The back end components include a query service and a command service. A message broker exchanges messages between domain services and the query service and command service. The frontend components provide actions to the backend components. The backend components provide queries to the frontend components.

Figure 22:
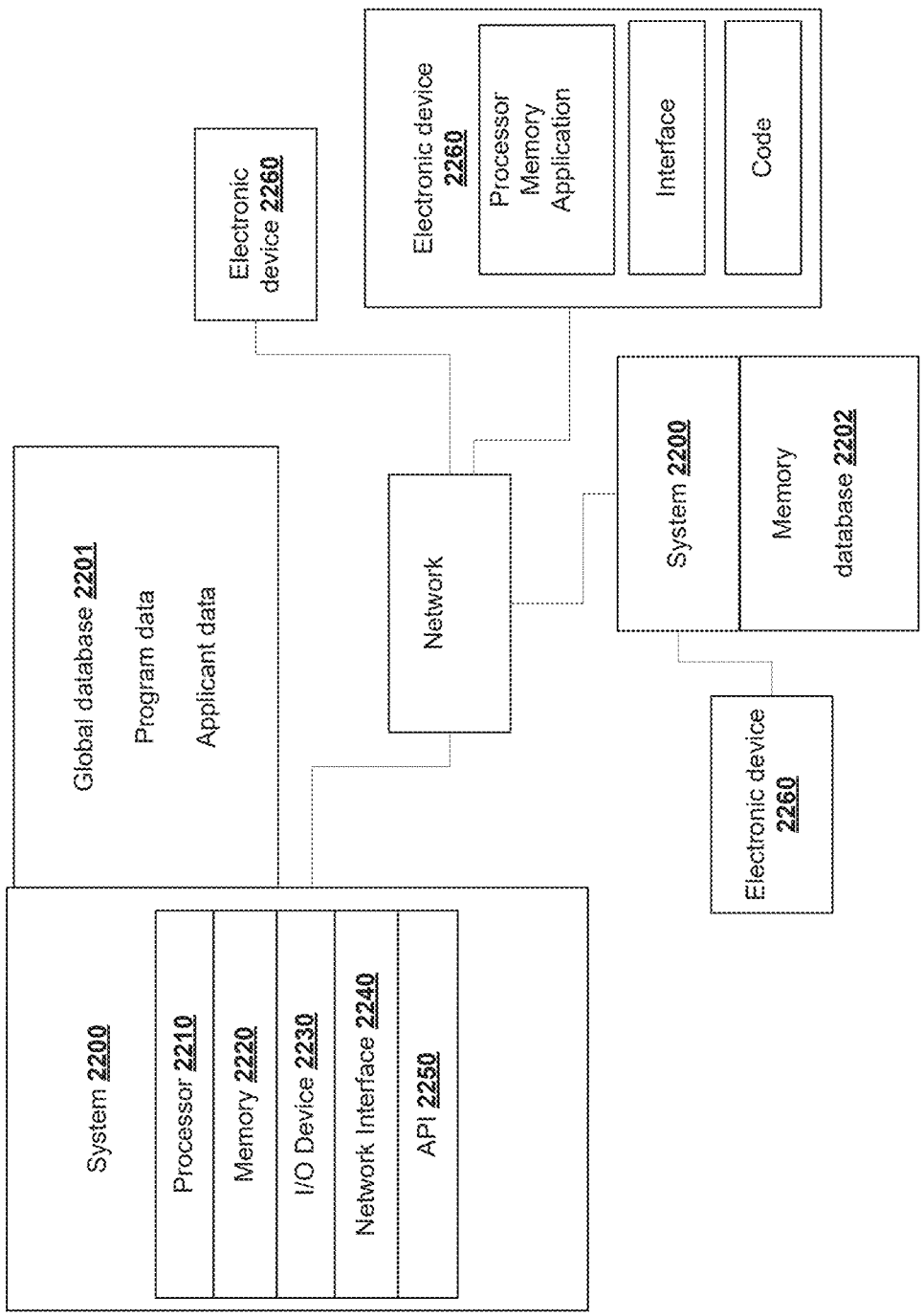
FIG. 22 shows another example assessment system according to embodiments described herein.

FIG. 22 shows another example assessment system according to embodiments described herein.

As depicted, assessment system 1 includes a server system 2200 with at least one processor 2210, memory 2220, I/O device 2230, network interface 2240 and API 2250. The assessment system 1 includes a software application with instructions stored on non-transitory memory 2220 and executable by a controller processor 2210, and accessible via a network interface 2240, such as the internet. The API 2250 can be used to generate commands for API services.

Assessment system 1 is connected to a global database 2201 that contains program data and applicant data. The assessment system 1 may be connected via a network to electronic devices 2260 or computing devices operable by users (e.g. applicants and representatives) to access remote network resources and exchange data. The assessment system 1 may be connected to another system 1 with a memory containing a database 2202 storing applicant and program data. Each electronic device has a memory and a processor with an executable application of code, and an interface for providing output data and receiving.

Figure 23:
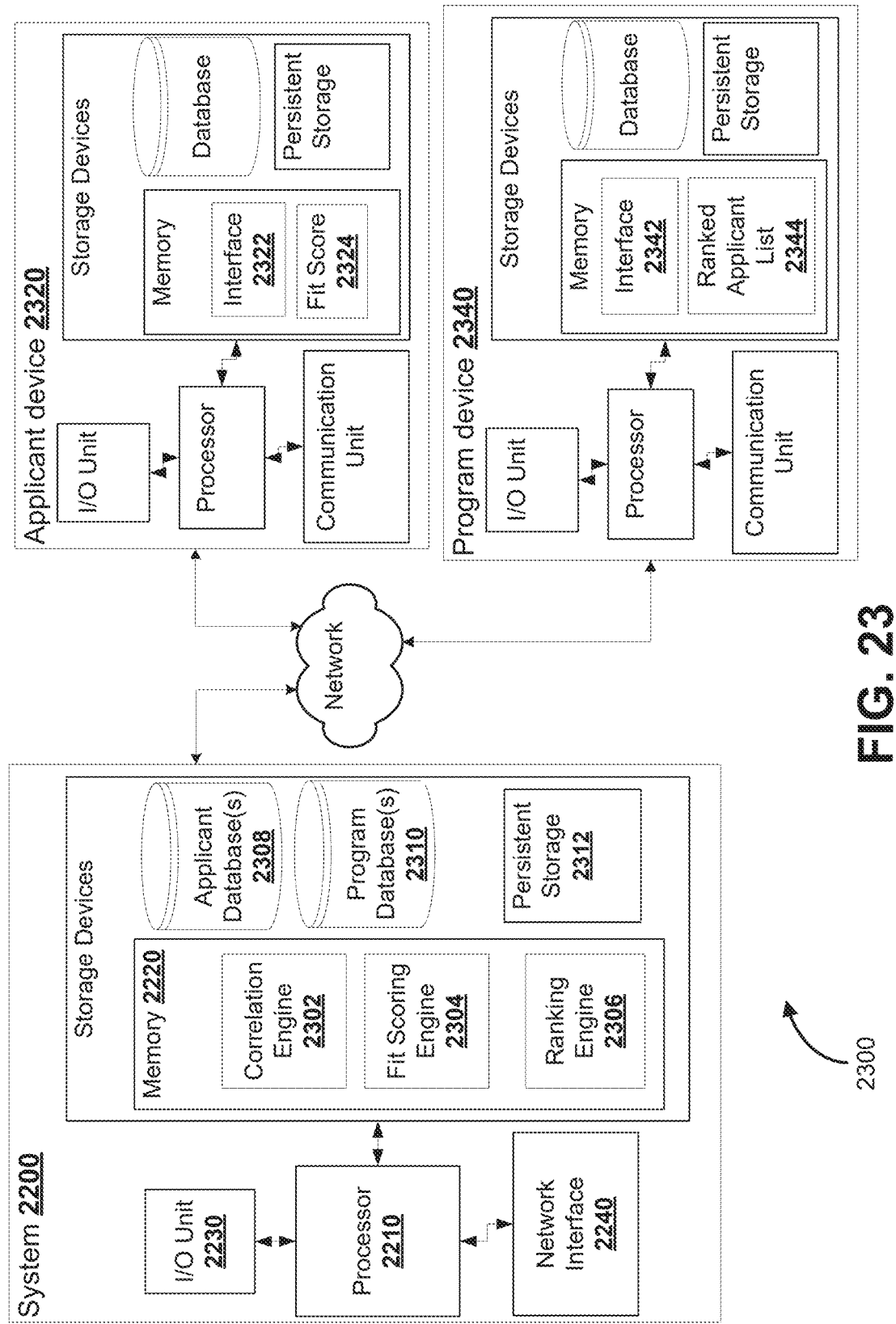
FIG. 23 shows another example assessment system according to embodiments described herein.

FIG. 23 shows another example assessment system 1. Assessment system 1 includes a server system 2200 and electronic devices or computing devices connected by a network 616. Examples of the electronic devices include an applicant device 2320 and a program device 2340.

Server system 2200 includes at least one I/O unit 2230, one processor 2210, one network interface 2240 and storage devices. Storage devices includes a memory 2220, at least one applicant database 2308, at least one program database 2310 and persistent storage 2312. Memory 2220 has a correlation engine 2302, fit scoring engine 2304 and ranking engine 2306.

Each electronic device, such as applicant device 2320 and program device 2340, includes at least one I/O unit, processor, communication unit and storage devices. Storage devices includes a memory, database, and persistent storage. Memory of applicant device 2320 consists of an interface 2322 for displaying a fit score 610. Memory of program device 2340 consists of an interface 2342 for displaying a ranked applicant list 2344.

Figure 24:
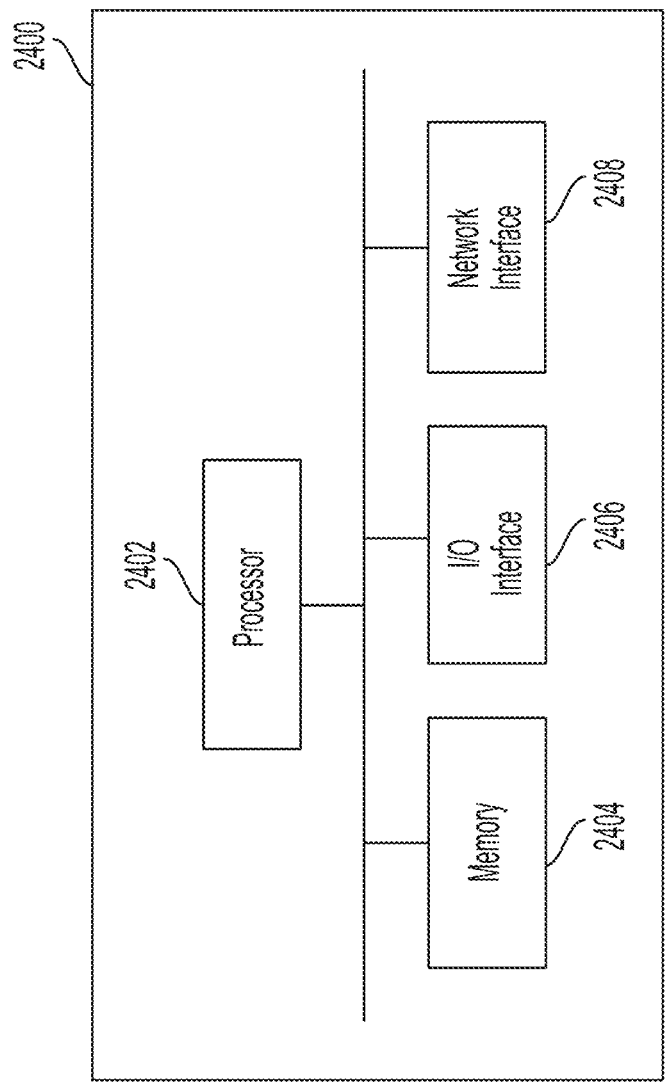
FIG. 24 shows an example electronic device to implement aspects of assessment system.

FIG. 24 shows an example electronic device 2400 to implement aspects of assessment system. As depicted, computing device 2400 includes at least one processor 2402, memory 2404, at least one I/O interface 2406, and at least one network interface 2408.

Each processor 2402 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

Memory 2404 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 2406 enables computing device 2400 to interconnect with one or more input devices, such as a keyboard, mouse, camera, touch screen and a microphone, or with one or more output devices such as a display screen and a speaker.

Each network interface 2408 enables computing device 2400 to communicate with other components, to exchange data with other components, to access and connect to network resources, to serve applications, and perform other computing applications by connecting to a network (or multiple networks) capable of carrying data, including a combination of different types of networks.

Computing device 2400 is operable to register and authenticate users (using a login, unique identifier, and password for example) prior to providing access to applications, a local network, network resources, other networks and network security devices. Computing devices 2400 may serve one user or multiple users.

For simplicity only one computing device 2400 is shown but system 1 may include more computing devices 2400 operable by users to access remote network resources and exchange data. The computing devices 2400 may be the same or different types of devices. The computing device 2400 contains at least one processor, a data storage device (including volatile memory or non-volatile memory or other data storage elements or a combination thereof), and at least one communication interface. The computing device components may be connected in various ways including directly coupled, indirectly coupled via a network, and distributed over a wide geographic area and connected via a network (which may be referred to as "cloud computing").

Figure 25:
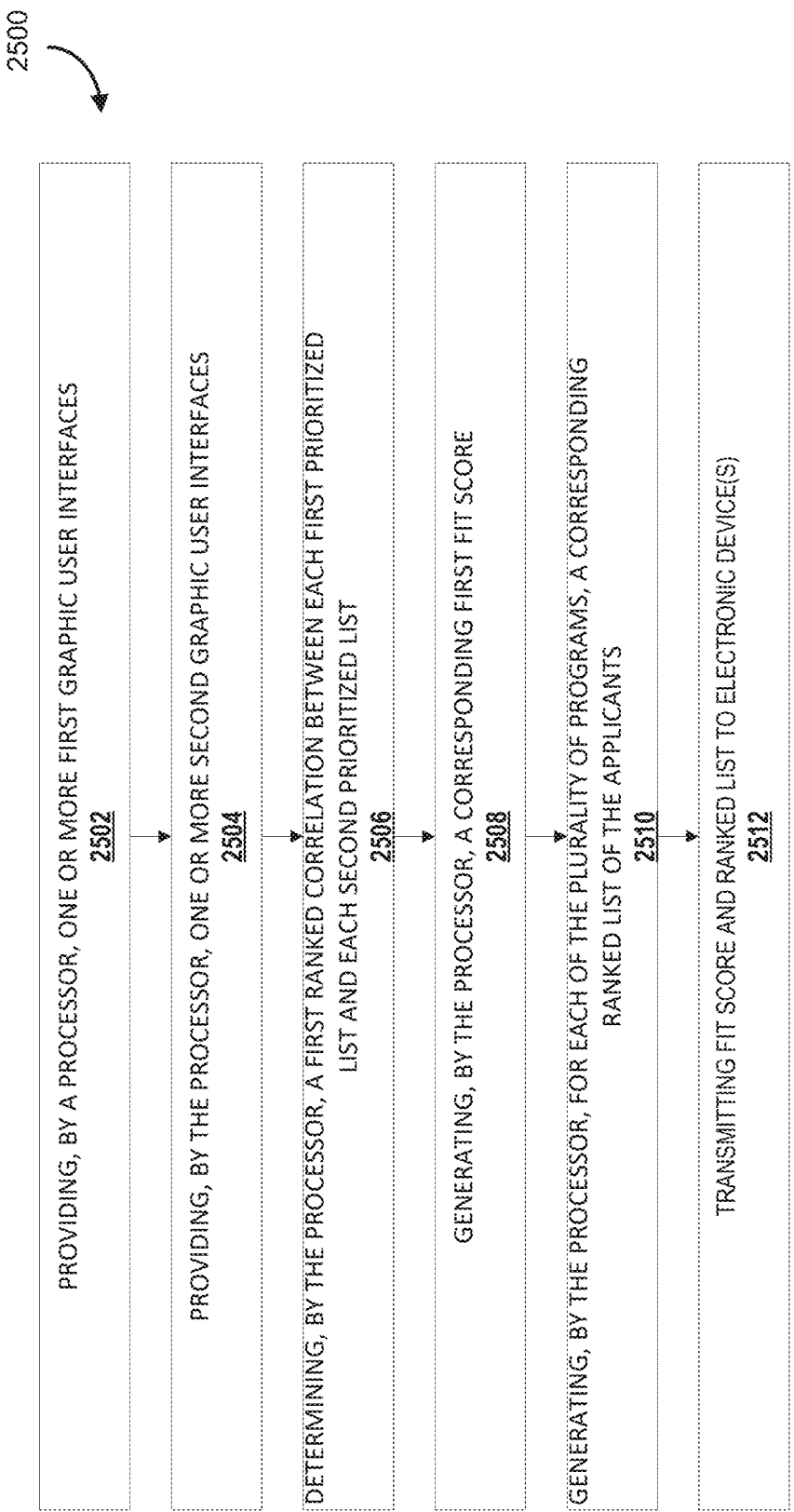
FIG. 25 shows an example process for assessment and matching.

FIG. 25 shows an example process 2500 for assessment and matching. The method involves executing the following steps.

In step 2502, a processor provides one or more first graphic user interfaces configured to enable each of a plurality of applicants to enter a respective first prioritized list of a first plurality of characteristics in a first category relating to one or more positions offered by each of a plurality of programs into which the plurality of applicants wish to apply. Examples of an applicant include graduating medical students. Example programs include United States graduate medical education (US-GME) residency training programs. Example categories include culture, work environment, and training environment (pedagogy). Each category can relate to a set of characteristics.

In step 2504, the processor provides one or more second graphic user interfaces configured to enable one or more representatives of each of the plurality of programs to enter a second prioritized list of the first plurality of characteristics in the first category.

In step 2506, the processor determines a first ranked correlation between each first prioritized list and each second prioritized list. The rank correlation may be calculated using a suitable rank correlation formula, such as one of Spearman's rho or Kendall's tau or a combination of both, such as Spearman's rho/Kendall's tau, with values ranging from −1 (perfect negative correlation) to +1 (perfect positive correlation), with 0 signifying no association.

In step 2508, the processor generates a corresponding first fit score for each of the plurality of applicants for each of the plurality of programs based on the first ranked correlations. The fit score may be derived using the equation Fit=50x+50, where x is the rank correlation. The transformation enables easier interpretation of the fit scores, i.e. the scaling (multiplication) transformation makes the scores larger and easier to interpret, and the shift (addition) transformation ensures all scores are positive, with a minimum of 0 and a maximum of 100.

In step 2510, the processor, for each of the plurality of programs, generates a corresponding ranked list of the applicants that applied thereto, based on the corresponding first fit scores. Each program may choose to focus impressionistically on one or two categories they prioritize most as a program by disproportionately weighting one or two of the fit scores over the others resulting in a disproportionately weighted average. For example, with reference to FIG. 11B, some programs, who value vulture most, may request or establish a ranked list 60, which prioritizes Applicant A, because of their highest fit score (68), and reject Applicant B, because of their lowest fit score (3), i.e. weigh culture fit score 100% and other fit scores 0%.

In step 2512, the corresponding first fit score can be sent, e.g. via email or letter, to each of the plurality of applicants for each of the plurality of programs that they applied to and the corresponding ranked list of the applicants can be sent to each of the plurality of programs. Each applicant may also receive a compiled and sorted list of all programs they applied to in order of average fit score and/or in order of adjusted fit score based on the adjust fit score calculation provided by the program. As well, the applicant may receive a list of programs to which they did not apply, but which ranked most highly in strength of fit score to that applicant's fit score.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The systems and methods described herein may provide different example technical effects and solutions e.g. better memory usage, improved processing, improved bandwidth usage.

The following discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

For example, and without limitation, the computing device may be a server, network appliance, set-top box, embedded device, computer expansion module, personal computer, laptop, cellular telephone, smartphone device, or any other computing device capable of being configured to carry out the methods described herein.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps The foregoing description of one or more example embodiments has been presented for the purposes of illustration and description. It is not intended to be exhaustive or to limit the invention to the precise form disclosed. Many modifications and variations are possible in light of the above teaching. It is intended that the scope of the disclosure be limited not by this detailed description. As can be understood, the examples described above and illustrated are intended to be exemplary only.

What is claimed is:

1. A computer system for secure online automatic comparison assessments to identify alignment between applicants and programs, the system comprising: a plurality of client web applications comprising a plurality of applicant portals and a plurality of program portals; a plurality of application services that receive commands from the plurality of client web applications and provide data in response, the plurality of application services comprising a category application programming interface service, a correlation application programming interface service, a scoring application programming interface service, a ranking application programming interface service, an administrator application programming interface service, and account application programming interface service; an application programming interface gateway that transmits messages and exchanges data between the plurality of client web applications and the plurality of application services, wherein the application programming interface gateway receives network traffic and balances load across system resources by splitting and spreading the network traffic; one or more memories and one or more hardware processors coupled to the memories programmed with executable instructions, the instructions configuring the one or more hardware processors with a plurality of domain services for online assessment of applicants and programs, the plurality of domain services comprising a category service, a correlation service, a scoring service, a ranking service, an administrator service, and account service; a message queue service for coordinating messages between the plurality of application services and the plurality of domain services instead of the plurality of application services and the plurality of domain services communicating directly, wherein the message queue service enables delivery of a message to an offline application service or an offline domain service, wherein the message queue service enables the plurality of application services and the plurality of domain services to perform functions without having to understand protocols, configurations, and commands of other services; wherein the plurality of client web applications and the plurality of application services are in communication via the application programming interface gateway, wherein the plurality of application services and the plurality of domain services are in communication via the message queue service; wherein each of the plurality of applicant portals is configured with one or more first graphic user interfaces configured to illustrate a first plurality of characteristics in a first category for comparison assessment of the illustrated characteristics to receive applicant comparison assessment results of the illustrated characteristics, wherein the system uses the applicant comparison assessment results for compiling a respective first prioritized list of the first plurality of characteristics in the first category relating to one or more positions offered by each of a plurality of programs into which the plurality of applicants wish to apply; wherein each of the plurality of program portals is configured with one or more second graphic user interfaces configured to illustrate the first plurality of characteristics in the first category for comparison assessment of the illustrated characteristics to receive program comparison assessment results of the illustrated characteristics, wherein the system uses the program comparison assessment results for compiling a respective second prioritized list of the first plurality of characteristics in the first category; wherein the category service and the category application programming interface service manage categories and characteristics, wherein the category service and the category application programming interface service generate the first plurality of characteristics in the first category, wherein the category service and the category application programming interface service provide the first plurality of characteristics in the first category to each of the plurality of applicant portals for populating the one or more first graphic user interfaces to receive the comparison assessment results of the illustrated characteristics, wherein the category service and the category application programming interface service provide the first plurality of characteristics in the first category to each of the plurality of program portals for populating the one or more second graphic user interfaces to receive the comparison assessment results of the illustrated characteristics; wherein the correlation service and the correlation application programming interface service determine a first ranked correlation between each first prioritized list and each second prioritized list; wherein the scoring service generates a corresponding first fit score for each of the plurality of applicants for each of the plurality of programs based on the first ranked correlations, the first fit score quantifying strength of association between a program's overall ranking of the first category of the first plurality of characteristics, and a respective applicant's ranking of the first category of the first plurality of characteristics, and transmit the fit scores to the scoring application programming interface service via the message queue service; wherein the ranking service generates a corresponding ranked list of the applicants based on the corresponding first fit scores, and transmits the corresponding ranked list of the applicants to the application programming interface service via the message queue service; wherein the application programming interface gateway transmits the respective corresponding first fit score to each of the plurality of applicant portals for each of the plurality of programs that the plurality of applicants applied to, and transmits the respective corresponding ranked list of the applicants to each of the plurality of program portals; an auto-scaling cluster that manages the scaling of components of system, the auto-scaling cluster with a control plane network for an auto-scaling controller node group of multiple nodes and a data plane network for an auto-scaling worker node group of multiple worker nodes, the control plane network being a set of services running on the multiple nodes that communicate with the multiple worker nodes of the auto-scaling worker node group that work to serve the application services and the domain services, the data plane network providing communication between the services and implementing functionality of the services, wherein the auto-scaling controller node group adds nodes of the groups dynamically in response to requests by the application services and the domain services, wherein the worker nodes of the worker node group provide core compute resources and serve functions of the application services and the domain services, wherein the number of worker nodes scales depending on demands of the services; a production cluster with a plurality of availability zones on physically different data centers on different hardware infrastructure to provide redundancy, wherein the plurality of availability zones are mirrored so that when there is a fault on one availability zone the system can continue running on another availability zone; and wherein the production cluster has public subnets and private subnets, wherein the public subnets comprise a secure gateway, wherein traffic for the application services and the domain services comes into the system via the secure gateway and a load balancer balances load across the system by splitting and spreading the traffic, wherein the public subnets forwards the traffic into the private subnets, wherein there is no way to access the private subnets except via the secure gateway, wherein the private subnets have multiple nodes that can scale automatically using the auto-scaling controller node group.

2. The system of claim 1 wherein the application services and domain services are implemented by at least one physical machine and at least one worker node, the physical machine providing a plurality of virtual machines corresponding to the plurality of application services, wherein the physical machine includes a load balancer to balance load across the plurality of virtual machines for horizontal scalability, the worker node providing core compute resources to run different applications for online testing and serve functions for the application services and the domain services, wherein the worker node is a physical or virtual machine comprising a plurality of pods, wherein each of the plurality of pods is an application of containers designed to run on the physical machine, wherein the application services and the domain services are on multiple pods running on multiple nodes to provide fault tolerance by multiple instances running on the multiple nodes with the multiple pods, wherein the application services and the domain services route to different pods and nodes to provide scalability and flexibility.

3. A computer implemented method comprising: providing, by a processor, one or more applicant portals with one or more first graphic user interfaces configured to illustrate a first plurality of characteristics in a first category for comparison assessment of the illustrated characteristics to receive applicant comparison assessment results of the illustrated characteristics, wherein the processor uses the applicant comparison assessment results for compiling a respective first prioritized list of the first plurality of characteristics in the first category relating to one or more positions offered by each of a plurality of programs into which the plurality of applicants wish to apply, wherein the one or more applicant portals are client applications connected to a cluster of application services and domain services by an application programming interface gateway; providing, by the processor, one or more program portals with one or more second graphic user interfaces configured to illustrate the first plurality of characteristics in the first category for comparison assessment of the illustrated characteristics to receive program comparison assessment results of the illustrated characteristics, wherein the processor uses the program comparison assessment results for compiling a respective second prioritized list of the first plurality of characteristics in the first category, wherein the one or more program portals are client applications connected to the cluster of the application services and the domain services by the application programming interface gateway; determining, by the processor using the application service and the domain services, a first ranked correlation between each first prioritized list and each second prioritized list; generating, by the processor using the application service and the domain services, a corresponding first fit score for each of the one or more applicant portals for each of the plurality of programs based on the first ranked correlations, the first fit score quantifying strength of association between a program's overall ranking of the first category of the first plurality of characteristics, and a respective applicant's ranking of the first category of the first plurality of characteristics; generating, by the processor using the application service and the domain services, for each of the plurality of programs, a corresponding ranked list of the applicants that applied thereto, based on the corresponding first fit scores; sending, by the processor using the application service and the domain services, the corresponding first fit score to each of the one or more applicant portals for each of the plurality of programs that they applied to; and sending, by the processor using the application service and the domain services, the corresponding ranked list of the applicants to each of the one or more program portals; an auto-scaling cluster that manages the scaling of components of system, the auto-scaling cluster with a control plane network for an auto-scaling controller node group of multiple nodes and a data plane network for an auto-scaling worker node group of multiple worker nodes, the control plane network being a set of services running on the multiple nodes that communicate with the multiple worker nodes of the auto-scaling worker node group that work to serve the application services and the domain services, the data plane network providing communication between the services and implementing functionality of the services, wherein the auto-scaling controller node group adds nodes of the groups dynamically in response to requests by the application services and the domain services, wherein the worker nodes of the worker node group provide core compute resources and serve functions of the application services and the domain services, wherein the number of worker nodes scales depending on demands of the services; a production cluster with a plurality of availability zones on physically different data centers on different hardware infrastructure to provide redundancy, wherein the plurality of availability zones are mirrored so that when there is a fault on one availability zone the system can continue running on another availability zone; and wherein the production cluster has public subnets and private subnets, wherein the public subnets comprise a secure gateway, wherein traffic for the application services and the domain services comes into the system via the secure gateway and a load balancer balances load across the system by splitting and spreading the traffic, wherein the public subnets forwards the traffic into the private subnets, wherein there is no way to access the private subnets except via the secure gateway, wherein the private subnets have multiple nodes that can scale automatically using the auto-scaling controller node group.

4. The method according to claim 3, wherein the one or more first graphic user interfaces are configured to enable each of the plurality of applicants to enter a third prioritized list of a second plurality of characteristics in a second category relating to the one or more positions offered by each of the plurality of programs into which the plurality of applicants wish to apply; wherein the one or more second graphic user interfaces are configured to enable the one or more representatives of each of the plurality of programs to enter a fourth prioritized list of the second plurality of characteristics in the second category; further comprising: determining, by the processor, a second ranked correlation between each third prioritized list and each fourth prioritized list, and generating a corresponding second fit score for each of the plurality of applicants for each of the plurality of programs based on the second ranked correlations; generating, by the processor, for each of the plurality of programs, the corresponding ranked list of the applicants based on the corresponding first fit scores and the corresponding second fit scores; and sending the corresponding second fit score to each of the plurality of applicants.

5. The method according to claim 4, wherein one or more of the corresponding ranked lists of applicants is based on a disproportionately weighted average of the first fit score and the second fit score; and wherein the one or more second graphic user interfaces are configured to enable the one or more representatives of each of the plurality of programs to enter details of the disproportionately weighted average.

6. The method according to claim 4, further comprising presenting, at the applicant portal, a first series of forced choice comparisons including pairs of the first plurality of characteristics to choose from; and wherein the method further comprises determining the first ranked correlations based on results of the first series of forced choice comparisons.

7. The method according to claim 6, wherein further comprising presenting, at the applicant portal, the first series of forced choice comparisons including the pairs of the first plurality of characteristics with a sliding scale to choose from.

8. The method according to claim 6, further comprising presenting, at the program portal, a second series of forced choice comparisons including the pairs of the first plurality of characteristics to choose from; and wherein the method further comprises determining the first ranked correlations based on results of the second series of forced choice comparisons.

9. The method according to claim 3, wherein the first ranked correlation is based on a rank correlation process, selected from one or more of Spearman's rho, Kendall's tau, or Pearson's correlation.

10. The method according to claim 6, wherein the first fit score is generated according to: fit score=50 x the first ranked correlation +50.

11. The method according claim 4, wherein the one or more first graphic user interfaces are configured to enable each of the plurality of applicant portals to receive a fifth prioritized list of a third plurality of characteristics in a third category relating to the one or more positions offered by each of the plurality of programs into which the plurality of applicants wish to apply; wherein the one or more second graphic user interfaces are configured to enable the one or more program portals of each of the plurality of programs to receive a sixth prioritized list of the third plurality of characteristics in the third category; further comprising: determining, by the processor, a third ranked correlation between each fifth prioritized list and each sixth prioritized list, and generating a corresponding third fit score for each of the plurality of applicants for each of the plurality of programs based on the third ranked correlations; generating, by the processor, for each of the plurality of programs, the corresponding ranked list of the applicants based on the corresponding first fit scores, the corresponding second fit scores, and the corresponding third fit scores; and sending the corresponding third fit score to each of the plurality of applicants.

12. The method according to claim 3, further comprising: generating, by the processor, for a selected one of the plurality of programs, a guidance report including general features of applicants that did not apply to the selected program, but generated corresponding first fit scores over a predetermined threshold; and sending the guidance report to the selected one of the plurality of programs.

13. The method according to claim 3, further comprising: generating, by the processor, for a selected applicant of the plurality of applicants, a guidance list of the programs that the selected applicant did not apply to, but generated corresponding first fit scores over a predetermined threshold; sending the guidance list to the selected one of the plurality of applicants.

14. A computing apparatus for providing secure online automatic comparison assessments to identify alignment between applicants and programs comprising: a first processor; and a first memory storing instructions that, when executed by the processor, configure the computing apparatus to: provide a plurality of client web applications comprising a plurality of applicant portals and a plurality of program portals; receive, from one or more of the applicant portals with a corresponding one or more first graphic user interfaces that illustrate a first plurality of characteristics in a first category for comparison assessment of the illustrated characteristics to receive applicant comparison assessment results of the illustrated characteristics, wherein the apparatus uses the applicant comparison assessment results for compiling a respective first prioritized list of the first plurality of characteristics in the first category relating to one or more positions offered by each of a plurality of programs into which the plurality of applicants wish to apply, the one or more applicant portals at a corresponding one or more applicant devices having one or more input devices configured to collect the applicant comparison assessment results for compiling the first prioritized list data and having a transmitter for transmitting the applicant comparison assessment results for compiling the first prioritized list data; receive, from one or more of the program portals with a corresponding one or more second graphic user interfaces that illustrate the first plurality of characteristics in the first category for comparison assessment of the illustrated characteristics to receive program comparison assessment results of the illustrated characteristics, wherein the system uses the program comparison assessment results for compiling a respective second prioritized list of the first plurality of characteristics in the first category, the one or more program portals at a corresponding one or more program devices having one or more input devices configured to collect the program comparison assessment results for compiling the second prioritized list data and having a transmitter for transmitting the program comparison assessment results for compiling the second prioritized list data; transmit, by an application programming interface, messages and received input data between the plurality of client web applications and a plurality of application services; use a message queue service for coordinating messages between the plurality of application services and a plurality of domain services for secure online assessment of applicants and programs, instead of the plurality of application services and the plurality of domain services communicating directly, wherein the message queue service enables delivery of a message to an offline application service or an offline domain service, wherein the message queue service enables the plurality of application services and the plurality of domain services to perform functions without having to understand protocols, configurations, and commands of other services; determine, by the plurality of domain services, a first ranked correlation between each first prioritized list and each second prioritized list, generate, by the plurality of domain services, a corresponding first fit score for each of the plurality of applicants for each of the plurality of programs based on the first ranked correlations, the first fit score quantifying strength of association between a program's overall ranking of the first category of the first plurality of characteristics, and a respective applicant's ranking of the first category of the first plurality of characteristics; generate, by the plurality of domain services, for each of the plurality of programs, a corresponding ranked list of the applicants that applied thereto based on the corresponding first fit scores; send, by the application programming interface service via the message queue service, the corresponding first fit score to each of the one or more applicant portals for each of the plurality of programs that they applied to, the corresponding first fit score being a limited amount of more detailed data not indicating the program comparison assessment results and not indicating the second prioritized list of the first plurality of characteristics in the first category for each of the plurality of programs to prevent reverse engineering of the corresponding first fit score; and send, by the application programming interface service via the message queue service, the corresponding ranked list of the applicants to each of the one or more program portals; an auto-scaling cluster that manages the scaling of components of system, the auto-scaling cluster with a control plane network for an auto-scaling controller node group of multiple nodes and a data plane network for an auto-scaling worker node group of multiple worker nodes, the control plane network being a set of services running on the multiple nodes that communicate with the multiple worker nodes of the auto-scaling worker node group that work to serve the application services and the domain services, the data plane network providing communication between the services and implementing functionality of the services, wherein the auto-scaling controller node group adds nodes of the groups dynamically in response to requests by the application services and the domain services, wherein the worker nodes of the worker node group provide core compute resources and serve functions of the application services and the domain services, wherein the number of worker nodes scales depending on demands of the services; a production cluster with a plurality of availability zones on physically different data centers on different hardware infrastructure to provide redundancy, wherein the plurality of availability zones are mirrored so that when there is a fault on one availability zone the system can continue running on another availability zone; and wherein the production cluster has public subnets and private subnets, wherein the public subnets comprise a secure gateway, wherein traffic for the application services and the domain services comes into the system via the secure gateway and a load balancer balances load across the system by splitting and spreading the traffic, wherein the public subnets forwards the traffic into the private subnets, wherein there is no way to access the private subnets except via the secure gateway, wherein the private subnets have multiple nodes that can scale automatically using the auto-scaling controller node group.

15. The apparatus according to The apparatus according to wherein the one or more first graphic user interfaces are configured to enable each of the plurality of applicants to enter a third prioritized list of a second plurality of characteristics in a second category relating to the one or more positions offered by each of the plurality of programs into which the plurality of applicants wish to apply; wherein the one or more second graphic user interfaces are configured to enable the one or more representatives of each of the plurality of programs to enter a fourth prioritized list of the second plurality of characteristics in the second category; wherein the instructions that, when executed by the processor, also configure the computing apparatus for: determining, by the processor, a second ranked correlation between each third prioritized list and each fourth prioritized list, and generating a corresponding second fit score for each of the plurality of applicants for each of the plurality of programs based on the second ranked correlations; generating, by the processor, for each of the plurality of programs, the corresponding ranked list of the applicants based on the corresponding first fit scores and the corresponding second fit scores; and sending the corresponding second fit score to each of the plurality of applicant portals.

16. The apparatus according to claim 14, wherein the applicant portal presents to each applicant a first series of forced choice comparisons including pairs of the first plurality of characteristics to choose from; and wherein the processor determines the first ranked correlations based on results of the first series of forced choice comparisons.

17. The apparatus according to claim 16, wherein the applicant portal presents to each applicant the first series of forced choice comparisons including the pairs of the first plurality of characteristics with a sliding scale to choose from.

18. The apparatus according to claim 16, wherein the program portal presents to each representative a second series of forced choice comparisons including the pairs of the first plurality of characteristics to choose from; and wherein the processor determines the first ranked correlations based on results of the second series of forced choice comparisons.

19. The apparatus according to claim 14, wherein the one or more first graphic user interfaces are configured to enable each of the plurality of applicants to enter a fifth prioritized list of a third plurality of characteristics in a third category relating to the one or more positions offered by each of the plurality of programs into which the plurality of applicants wish to apply; wherein the one or more second graphic user interfaces are configured to enable the one or more representatives of each of the plurality of programs to enter a sixth prioritized list of the third plurality of characteristics in the third category; wherein the instructions that, when executed by the processor, also configure the computing apparatus for: determining, by the processor, a third ranked correlation between each fifth prioritized list and each sixth prioritized list, and generating a corresponding third fit score for each of the plurality of applicants for each of the plurality of programs based on the third ranked correlations; generating, by the processor, for each of the plurality of programs, the corresponding ranked list of the applicants based on the corresponding first fit scores, the corresponding second fit scores, and the corresponding third fit scores; and sending the corresponding third fit score to each of the plurality of applicant portals.

20. The apparatus according to claim 16, wherein the instructions that, when executed by the processor, also configure the computing apparatus for: generating, by the processor, for a selected one of the plurality of programs, a guidance report including general features of applicants that did not apply to the selected program, but generated corresponding first fit scores over a predetermined threshold; and sending the guidance report to the selected one of the plurality of program portals.

21. The apparatus according to claim 14, wherein the instructions that, when executed by the processor, also configure the computing apparatus for: generating, by the processor, for a selected applicant of the plurality of applicants, a guidance list of the plurality of programs that the selected applicant did not apply to, but generated corresponding first fit scores over a predetermined threshold; and sending the guidance list to the selected one of the plurality of applicant portals.

22. The system of claim 1, wherein the notification service further transmits a limited amount of more detailed data to the plurality of applicant portals for each of the plurality of programs that the plurality of applicants applied to, the limited amount of more detailed data computed by the system regarding program fit of each of the plurality of applicants, the limited amount of more detailed data comprising each first prioritized list of the first plurality of characteristics in the first category for each of the plurality of applicants, the limited amount of more detailed data not indicating the program comparison assessment results and not indicating the second prioritized list of the first plurality of characteristics in the first category for each of the plurality of programs to prevent reverse engineering of the corresponding first fit score.

23. The system of claim 1 further comprising: an authentication service that authenticates each of the plurality of applicants prior to the one or more first graphic user interfaces illustrating the first plurality of characteristics in the first category for comparison assessment of the illustrated characteristics and receiving the applicant comparison assessment results of the illustrated characteristics.

24. The system of claim 1 further comprising machines for the application services and machines for the domain services, wherein a number of the machines scale based on traffic demand of the application services and the domain services, wherein a machine for an application services or domain service comprises a load balancer, multiple service instances, and a database, wherein the message queue services coordinates the messages between the machines of the application services and the machines of the domain services.

* * * * *